US012128561B2

(12) United States Patent
Stanton et al.

(10) Patent No.: US 12,128,561 B2
(45) Date of Patent: Oct. 29, 2024

(54) MATERIAL PICKER ASSEMBLY

(71) Applicant: AMP Robotics Corporation, Louisville, CO (US)

(72) Inventors: Matthew Stanton, Denver, CO (US); Jacob Fitzgerald, Wheat Ridge, CO (US); Jason M. Calaiaro, Denver, CO (US)

(73) Assignee: AMP Robotics Corporation, Louisville, CO (US)

( * ) Notice: Subject to any disclaimer, the term of this patent is extended or adjusted under 35 U.S.C. 154(b) by 287 days.

(21) Appl. No.: 17/490,368

(22) Filed: Sep. 30, 2021

(65) Prior Publication Data

US 2022/0111519 A1  Apr. 14, 2022

Related U.S. Application Data

(60) Provisional application No. 63/091,606, filed on Oct. 14, 2020.

(51) Int. Cl.
*B25J 9/16* (2006.01)
*B25J 9/00* (2006.01)
*B25J 13/08* (2006.01)
*B25J 15/00* (2006.01)
*B25J 15/06* (2006.01)
*B25J 17/02* (2006.01)

(52) U.S. Cl.
CPC ........... *B25J 9/1612* (2013.01); *B25J 9/0093* (2013.01); *B25J 13/081* (2013.01); *B25J 15/0052* (2013.01); *B25J 15/0625* (2013.01)

(58) Field of Classification Search
None
See application file for complete search history.

(56) References Cited

U.S. PATENT DOCUMENTS

| 8,136,802 | B2* | 3/2012 | Cho ................. B65G 47/91 269/21 |
| 8,615,123 | B2 | 12/2013 | Dabic |
| 9,498,887 | B1 | 11/2016 | Zevenbergen |
| 10,207,296 | B2 | 2/2019 | Garcia |
| 10,625,304 | B2 | 4/2020 | Kumar |
| 10,710,119 | B2 | 7/2020 | Kumar |
| 10,722,922 | B2 | 7/2020 | Kumar |
| 11,213,958 | B2 | 1/2022 | Chen |
| 11,492,215 | B1* | 11/2022 | Polido ............... B25J 15/0658 |
| 2017/0232479 | A1 | 8/2017 | Pietzka |
| 2020/0290088 | A1 | 9/2020 | Kumar |
| 2020/0368786 | A1 | 11/2020 | Kumar |
| 2021/0179366 | A1* | 6/2021 | McCoy, Jr. ......... B25J 15/0052 |
| 2021/0229133 | A1 | 7/2021 | Kumar |
| 2021/0346916 | A1 | 11/2021 | Kumar |
| 2022/0016675 | A1 | 1/2022 | Kumar |
| 2022/0023918 | A1 | 1/2022 | Kumar |

FOREIGN PATENT DOCUMENTS

| CN | 209815198 |  | 12/2019 |
| CN | 209815198 | U * | 12/2019 |

* cited by examiner

*Primary Examiner* — Jaime Figueroa
*Assistant Examiner* — Atticus A Cameron
(74) *Attorney, Agent, or Firm* — Van Pelt, Yi & James LLP

(57) ABSTRACT

A material picker assembly is disclosed, including: a connector configured to be attached to an actuator device; and a plurality of picker mechanisms, wherein each picker mechanism includes a suspension element that is configured to absorb impact on the picker mechanism by one or more objects.

10 Claims, 17 Drawing Sheets

MATERIAL PICKER ASSEMBLY

CROSS REFERENCE TO OTHER APPLICATIONS

This application claims priority to U.S. Provisional Patent Application No. 63/091,606 entitled MATERIAL PICKER ASSEMBLY filed Oct. 14, 2020 which is incorporated herein by reference for all purposes.

BACKGROUND OF THE INVENTION

Within many industrial facilities, objects are transported on conveyor belts from one location to another. Often a conveyor belt will carry an unsorted mixture of various objects and materials. Within recycling and waste management facilities for example, some of the conveyed objects may be considered desirable (e.g., valuable) materials while others may be considered undesirable contaminants. For example, the random and unsorted contents of a collection truck may be unloaded at the facility onto a conveyor belt. Although sorting personnel may be stationed to manually sort materials as it is transported on the belt, the use of sorting personnel is limiting because they can vary in their speed, accuracy, and efficiency and can suffer from fatigue over the period of a shift. Human sorters also require specific working conditions, compensation, and belt speeds. Production time is lost to training the many new employees that enter as sorters, and operation costs increase as injuries and accidents occur.

BRIEF DESCRIPTION OF THE DRAWINGS

Various embodiments of the invention are disclosed in the following detailed description and the accompanying drawings.

DETAILED DESCRIPTION

Figure 1A:
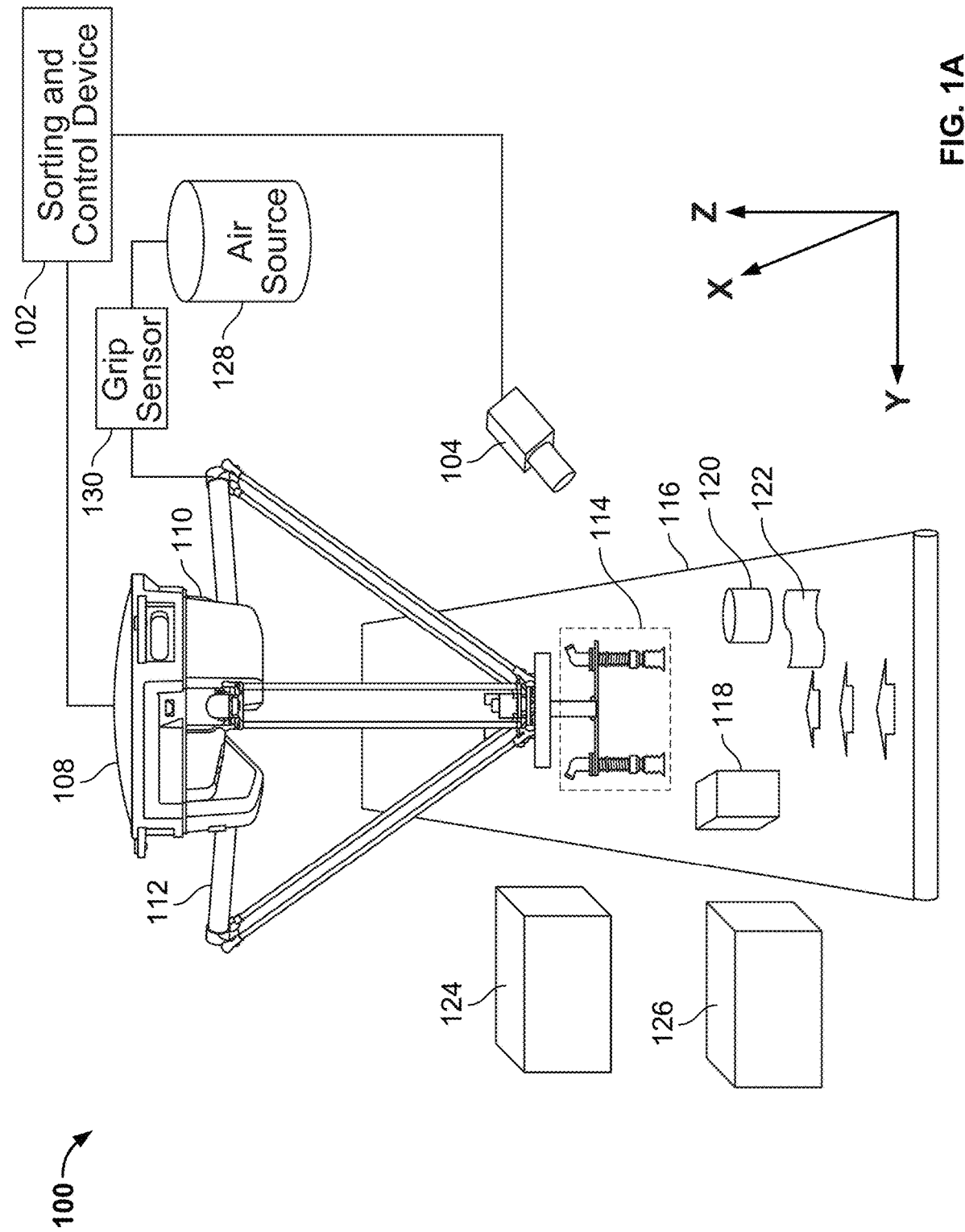
FIG. 1A is a diagram illustrating an example material sorting system in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The introduction of sorting systems (such as robotic systems, for example) for sorting materials has led to increased productivity and decreased contamination for Material Recovery Facilities (MRFs). Robots and similar systems have been utilized as a viable replacement, or supplement, for human sorters due to their speed, reliability, and durability. The objective of sorting systems is to recover the specific target material(s) and eject them into bunkers without introducing other materials (contaminants) into the sorted bunkers. One technique used by these sorting systems to grasp target materials involves the use of a robotically positioned suction gripper. The suction cup gripper can apply a substantial suction force to a targeted object so as to grasp the targeted object from a conveyor belt (for example). Once the object is captured, the robot can then reposition the suction gripper and release the object into a material deposit location by curtailing the suction force.

However, one challenge faced in using robotically positioned suction grippers is the inability to pick multiple pieces of material while over the conveyor belt. After each object is picked off the belt, the robot needs to move to the deposit location and then return to the picking position. Thus, time is wasted through vertical and lateral movement while only retrieving a single object.

Embodiments of a material picker assembly are described herein. A material picker assembly comprises a connector and also a plurality of picker mechanisms. The connector of the material picker assembly is configured to be attached to an actuator device. Each picker mechanism of the material picker assembly includes a suspension element that is configured to absorb impact on the picker mechanism by one or more objects. An example of the actuator device is a sorting robot with one or more arms. An example of a picker mechanism is a gripper that channels (e.g., vacuum/negative or positive) airflow and a suction attachment (e.g., cup) that is configured to capture/grip a target object. In various embodiments, the suspension element that is associated with each picker mechanism of the material picker assembly can be, at a given time, in one of at least two states: an extended state and a retracted state. When the suspension element of a picker mechanism is in the extended state, the suspension element is not collapsed and the picker mechanism is not holding onto an object. Put another way, when the suspension element of a picker mechanism is in the extended state, the picker mechanism is available to capture a target object. When the suspension element of a picker mechanism is in the retracted state, the suspension element is collapsed and the picker mechanism is holding onto an object. Put another way, when the suspension element of a picker mechanism is in the retracted state, the picker mechanism is not available to capture (another) target object. In various embodiments, the suspension element of each picker mechanism included in the material picker assembly can operate independently of the suspension element(s) of the other picker mechanisms of the same material picker assembly. In some embodiments, the suspension element of each picker mechanism can be manipulated between states independent of the position of the actuator device. By allowing the suspension element of a picker mechanism within the material picker assembly to retract/collapse in response to the picker mechanism capturing/picking up a target object, the retracted/collapsed picker mechanism is able to both avoid colliding into the actuator device and avoid interfering with the action of another picker mechanism of the same material picker assembly capturing a second target object.

In some embodiments, the suspension element of a picker mechanism can collapse from the extended state to the retracted state as a result of the picker mechanism successfully capturing a target object using a suction force and/or causing a rotational or other picker mechanism-specific actuation element to change the position of the suspension element from the extended position into the retracted position (e.g., the pneumatic cylinder of a suspension element comprising a linkage mechanism can be used to raise the extended linkage mechanism up to the retracted position). In some embodiments, returning the suspension element of a picker mechanism from the retracted state to the extended state includes changing the direction/rate of the airflow that was flowing through the picker mechanism (e.g., the airflow can be changed from a vacuum to a positive airflow) and/or causing a rotational or other picker mechanism-specific actuation element to change the position of the suspension element from a retracted position into the extended position (e.g., the pneumatic cylinder of a suspension element comprising a linkage mechanism can be used to lower the retracted linkage mechanism down to the extended position).

In various embodiments, a sorting and control device that is coupled to the actuator device is configured to send control signals to the actuator device to cause the actuator device to actuate the material picker assembly laterally and/or vertically towards a target object. In some embodiments, objects to be sorted are being transported along a conveyor device in a sorting line. Examples of materials to be sorted by a sorting line as described in various embodiments described herein include but are not limited to recycling, garbage, e-waste, demolition waste, packages, luggage, components on an assembly line, and produce. One or more sensors (e.g., such as a camera) capture information about a set of objects on the conveyor device and then send a sensor signal (e.g., an image frame) to the sorting and control device. The sorting and control device is configured to apply machine learning to the sensed information to identify at least one target object among the set of objects. The sorting and control device is then configured to select a picker mechanism from among the plurality of picker mechanisms to capture the target object. For example, the sorting and control device is configured to select the picker mechanism to capture the target object based on the current/projected location of the picker mechanism being the closest to the current/projected location of the target object and the picker mechanism currently being in the extended state. In some embodiments, the sorting and control device is configured to track the current extended or retracted state of each picker mechanism of the material picker assembly. After selecting a picker mechanism, the sorting and control device is configured to send a control signal to the actuator device to actuate the selected picker mechanism towards the target object (e.g., by moving the material picker assembly across the conveyor device and/or lower towards the conveyor device to better align the location of the selected picker mechanism with the location of the target object). In some embodiments, where the selected picker mechanism is a suction-based gripper, then the sorting and control device is configured to send a control signal to an air source to cause a vacuum/negative airflow to be emitted from the selected picker mechanism to assist the selected picker mechanism in capturing/gripping the target object. Upon impact with the target object, the suspension element of the selected picker mechanism retracts/collapses such that the suspension element of the selected picker mechanism that has successfully captured/gripped the target object is put into the retracted state. Because the material picker assembly has at least two picker mechanisms, the sorting and control device is able to cause the material picker assembly to pick up at least two target objects (one target object by each picker mechanism) before causing the actuator device to actuate the material picker assembly to drop the captured object(s) into one or more deposit locations to complete the sorting of the objects. As such, the efficiency of sorting target objects is greatly improved with the use of the material picker assembly with multiple picker mechanisms.

FIG. 1A is a diagram illustrating an example material sorting system in accordance with some embodiments. In the example of FIG. 1A, sorting system 100 includes conveyor device 116 (e.g., a conveyor belt) that is configured to transport objects towards an actuator device that is coupled to picker assembly 114. In the example of FIG. 1A, the actuator device is sorting robot 108. Material identified for removal from conveyor device 116 is referred to herein as "target objects." For example, an object may be identified for removal if it is identified to be of a target material type. Although waste products travelling on a conveyor device are used as example target objects in the example embodiments described herein, it should be understood that in alternate implementations of these embodiments, the target objects need not be waste materials but may comprise any type of material for which it may be desired to sort and/or segregate. Moreover, although a conveyor device is used as an example conveyance mechanism for transporting the target objects within reach of material picker assembly 114, it should be understood that in alternate implementations of these embodiments, other conveyance mechanisms may be employed. For example, for any of the embodiments described below, in place of an active conveyance mechanism such as a conveyor belt, an alternate conveyance mechanism may comprise a chute, slide, or other passive conveyance mechanism through and/or from which material tumbles, falls, or otherwise is gravity fed as it passes by the imaging device.

In some embodiments, sorting robot 108 comprises robotic actuator 110 that controls the position of robotic arms 112 based on instructions received from sorting and control device 102. Sorting robot 108 is instructed by instructions received from sorting and control device 102 to control the position (e.g., location, orientation, and/or height) of picker assembly 114 to pick up a target object (e.g., using one of potentially multiple picker mechanisms of material picker assembly 114) from conveyor device 116 and/or to control the position of material picker assembly 114 to drop/deposit the one or more picked-up target objects in a corresponding deposit location. Receptacles 124 and 126 are two example collection containers that are located at two different deposit locations. In some embodiments, each deposit location is to receive target objects of a corresponding material type. For example, each of receptacle 124 and receptacle 126 is designated to collect target objects of a different material type.

Material sorting system 100 further comprises at least one sensor such as sensor 104, which is utilized to capture information about objects on conveyor device 116 in order to discern target objects from non-target objects. For example, as described above, a "target object" is an object that is identified to have a target material type. For example, a "non-target object" is an object that is identified to not have a target material type (e.g., a contaminant). Sensor 104 may comprise an image capturing device (such as, for example, an infrared camera, visual spectrum camera, or some combination thereof) directed at conveyor device 116. While sensor 104 is shown to be a camera in FIG. 1A, other examples of sensor 104 may comprise any type of sensor that can detect and/or measure characteristics of objects on conveyor device 116. For example, sensor 104 may utilize any form of a sensor technology for detecting non-visible electromagnetic radiation (such as a hyperspectral camera, infrared, or ultraviolet), a magnetic sensor, a volumetric sensor, a capacitive sensor, or other sensors commonly used in the field of industrial automation. In some embodiments, sensor 104 is directed towards conveyor device 116 in order to capture object information from an overhead view of the materials being transported by conveyor device 116. Sensor 104 produces a sensor signal that is delivered to sorting and control device 102. The sensor signal that is delivered to sorting and control device 102 from sensor 104 may comprise, but is not necessarily, a visual image signal.

As will be described in further detail below, sensor 104 produces one or more sensor signals that are delivered to sorting and control device 102 and which may be used by sorting and control device 102 to send instructions to sorting robot 108 to cause sorting robot 108 to actuate material picker assembly 114 to either use a specified picker mechanism thereof to pick up a target object, or to drop off/place all picked-up target objects by one or more picker mechanisms thereof into one or more corresponding deposit locations. Because conveyor device 116 is continuously moving (e.g., along the X-axis) and transporting objects (e.g., such as objects 118, 120, and 122) towards sorting robot 108, the positions (e.g., along the X-axis) of target objects 118, 120, and 122 are continuously changing. As such, sensor 104 is configured to continuously capture object information (e.g., image frames) that shows the updated positions of the target objects (e.g., such as objects 118, 120, and 122) and send the captured object information to sorting and control device 102. As will be described in further detail below, sorting and control device 102 is configured to use a recent set of captured object information from sensor 104 to generate current information associated with the target objects. In various embodiments, sorting and control device 102 is then configured to use this current information associated with the target objects to select a picker mechanism (for which an associated suspension element is in the extended state) from material picker assembly 114 to use to capture a target object. Sorting and control device 102 is configured to send a control signal to sorting robot 108 to cause sorting robot 108 to move laterally across (e.g., across the X- and/or the Y-axes) conveyor device 116 to align the selected picker mechanism with the location of the target object and to lower (e.g., along the Z-axis, which is orthogonal to the surface of conveyor device 116) towards the target object. In some embodiments, sorting and control device 102 is further configured to send control signals to a pneumatic control system (not shown) that is coupled to material picker assembly 114 to activate a vacuum airflow using air source 128 that is employed by each of material picker assembly 114's picker mechanisms to pick up target objects. For example, sorting and control device 102 is further configured to send the control signals to the pneumatic control system close in time to when sorting and control device 102 is configured to send instructions to sorting robot 108 to perform the selected actions so that the vacuum airflow can be emitted from the selected picker mechanism to assist the selected picker mechanism in capturing the target object.

Target objects that are transported along conveyor device 116 may differ in height along the Z-axis relative to the surface of conveyor device 116. For example, target object 118 has a greater height than target object 120. Furthermore, different target objects have different compressibilities. In order to accommodate the varying heights and compressibilities of target objects that sorting robot 108 is configured to pick up and remove from conveyor device 116, in various embodiments, each picker mechanism of material picker assembly 114 includes a corresponding suspension element that is configured to retract (e.g., raise upwards along the Z-axis) when the picker mechanism picks up a target object. In some embodiments, the suspension element of a picker mechanism remains retracted/collapsed while an object is being gripped by the vacuum airflow that is being channeled by the picker mechanism. In such embodiments, the force of the vacuum blockage of a gripped object is sufficient to maintain the suspension element in the retracted/collapsed state, i.e., the extension force inherent in the suspension system is lower than the force exerted by the blocked vacuum. Not enabling a picker mechanism to retract/collapse when the picker mechanism picks up a target object could cause the picker mechanism or any other component of the actuator device, such as the robotic arms of a sorting robot, to become damaged from the upward force from the target object. Furthermore, not enabling a picker mechanism to retract/collapse when the picker mechanism picks up a target object could also prevent the picker mechanism from successfully gripping (e.g., via suction) the target object. The risk of the actuator device becoming damaged from the pushback from target objects and the risk of target objects not being able to be gripped by picker mechanisms are particularly present if sorting robot 108 drops material picker assembly 114 down the same, static distance each time to pick up a target object, irrespective to the actual height and compressibility factor of the target object. As such, that material picker assembly 114 has flexible picker mechanisms that include suspension elements is greatly beneficial to sorting robot 108's efficiency and longevity.

Whereas the suspension element of the selected picker mechanism of material picker assembly 114 was in the extended state prior to capturing the target object, after the selected picker mechanism of material picker assembly 114 picks up the target object, its suspension element is changed into the retracted state. In some embodiments, sorting and control device 102 is configured to determine that a capture action by the selected picker mechanism has been successful (e.g., because the picker mechanism has gripped onto the target object) based on an output from grip sensor 130. For example, grip sensor 130 comprises an airflow sensor and can be used to detect a change in the airflow going through the selected picker mechanism and that change in airflow can be used by sorting and control device 102 to determine a successful capture action by the selected picker mechanism. While grip sensor 130 is shown to be located between air source 128 and an arm of sorting robot 108 in FIG. 1A, in other examples, grip sensor 130 can be located elsewhere in the material sorting system to detect a change in airflow, such as, for example, within tubing that is attached to sorting robot 108 or within material picker assembly 114. After one or more picker mechanisms of material picker assembly 114 successfully pick up one or more target objects, sorting and control device 102 is configured to determine whether to actuate material picker assembly 114 away from conveyor device 116 and cause the picker mechanisms to release the target objects they had picked up into one or more deposit locations. After material picker assembly 114 releases the target objects that had been picked up by its picker mechanisms into deposit locations, the suspension element of each picker mechanism that had released a picked-up target returns from the retracted state and into the extended state, ready to pick up a new target object as sorting robot 108 moves material picker assembly 114 back over conveyor device 116 to pick up more target objects.

While material picker assembly 114 is shown to be actuated in multiple directions by a sorting robot 108 in FIG. 1A, in actual practice, material picker assembly 114 can be actuated in one or more directions by another type of mechanism.

Figure 1B:
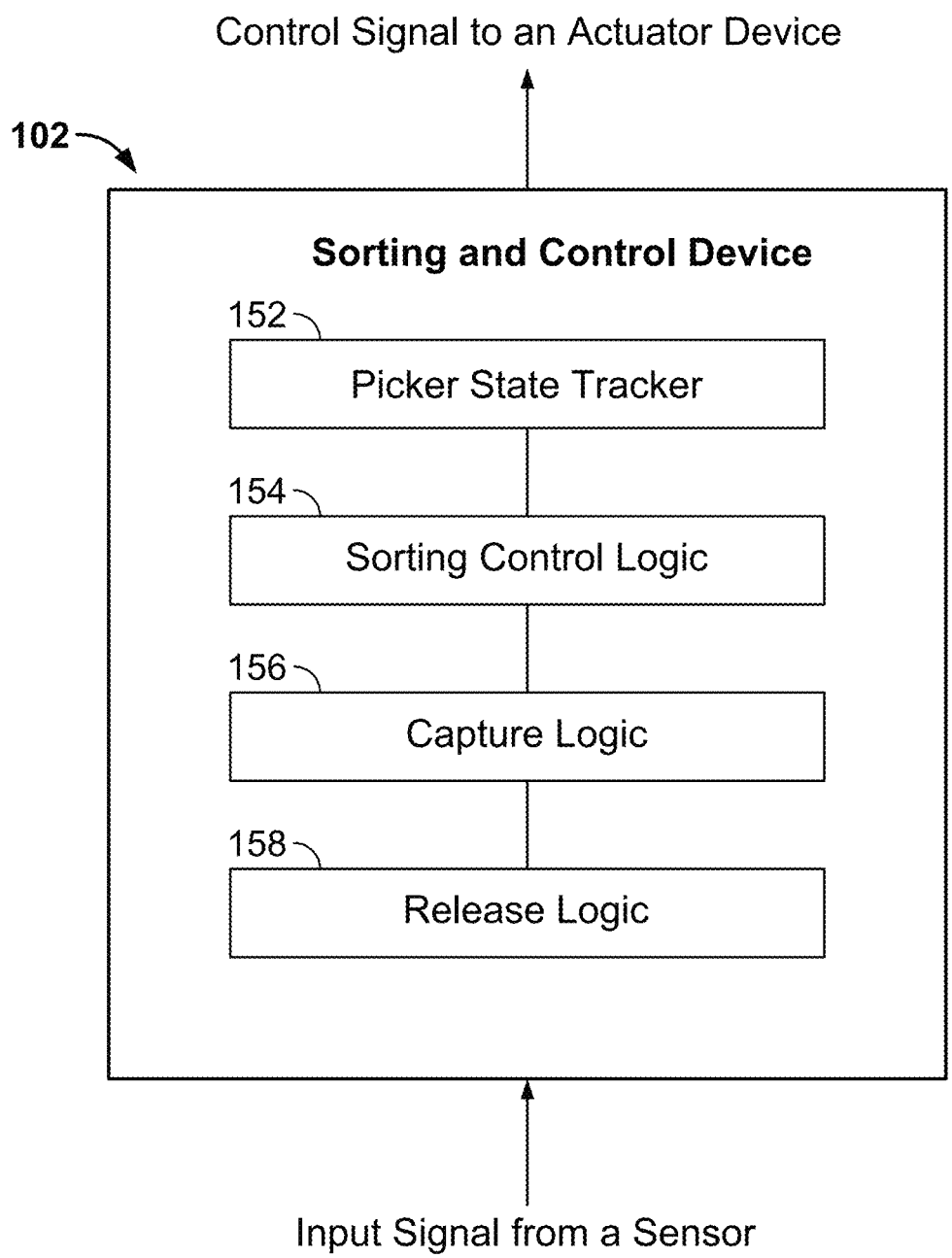
FIG. 1B is a diagram showing an example of a sorting and control device.

FIG. 1B is a diagram showing an example of a sorting and control device. In some embodiments, sorting and control device 102 of sorting system 100 of FIG. 1A may be implemented using the example of FIG. 1B. In the example of FIG. 1B, the sorting and control device includes picker state tracker 152, sorting control logic 154, capture logic 156, and release logic 158. In some embodiments, picker state tracker 152, sorting control logic 154, capture logic 156, and release logic 158 may either be implemented together on a common physical non-transient memory device, or on separate physical non-transient memory devices. In various embodiments, the sorting and control device may be implemented using a microprocessor coupled to a memory that is programmed to execute code to carry out the functions of the sorting and control device described herein. In other embodiments, the sorting and control device may additionally, or alternately, be implemented using an application specific integrated circuit (ASIC) or field programmable gate array (FPGA) that has been adapted for machine learning and/or cloud computing.

Picker state tracker 152 is configured to store the current state of each picker mechanism within a material picker assembly. In some embodiments, the current state of the picker mechanism comprises whether the suspension element of the picker mechanism is an extended state or a retracted state. Where the suspension element is a linkage mechanism that can rotate the picker mechanism about the picker mechanism's individual rotational axis, the picker's retracted state may also be associated with whether the picker is in a punting configuration (where the end of the picker is rotated away from being parallel to the surface of the conveyor belt) or not. As mentioned above, in some embodiments, when the suspension element of a picker mechanism is in the extended state, the picker mechanism has not yet picked up a target object and when the suspension element of a picker mechanism is in the retracted state, the picker mechanism has already picked up a target object. As will be described in further detail below, the current state of each picker mechanism of the material picker assembly will be used to determine whether a picker mechanism of the material picker assembly is to perform capture on a new target object (e.g., on a conveyor device) or whether one or more picker mechanisms with already picked-up target objects should release those target objects into one or more deposit locations.

Sorting control logic 154 comprises one or more neural processing units (not shown) and a neural network parameter set (which stores learned parameters utilized by the neural processing units). In various embodiments, sorting control logic 154 is configured to receive sensor signals (e.g., one or more image frames) from a sensor, which is configured to capture object information (e.g., using a sensor such as a camera) of objects that are being transported on a conveyor device. In some embodiments, sorting control logic 154 is configured to provide raw object data (which in the case of a camera sensor may comprise image frames, for example) as input to one or more neural network and artificial intelligence techniques of the neural processing units to locate and identify material appearing within the image frames that are target objects. As the term is used herein, an "image frame" is intended to refer to a collection or collected set of object data captured by a sensor that may be used to capture the spatial context of one or more target objects on the conveyor mechanism along with characteristics about the object itself. A feed of image frames captured by the sensor (e.g., sensor 104 of FIG. 1A) is fed, for example, to a machine learning inference technique implemented by neural processing units. The sequence of captured image frames may be processed by multiple processing layers, or neurons, of the neural processing units to evaluate the correlation of specific features with features of objects that it has previously learned.

In some embodiments, sorting control logic 154 is configured to determine based on picker state tracker 152, whether the current states of the picker mechanisms of the material picker assembly meet release criteria. A first example of release criteria is if the suspension elements of all of the picker mechanisms of the material picker assembly are in the retracted state, which indicates that all the picker mechanisms have picked-up target objects and therefore cannot pick up any further target objects. A second example of release criteria is if the suspension elements of fewer than all of the picker mechanisms of the material picker assembly are in the retracted state but that at least no new target object can be reached by the actuator device at the current time. If the release criteria are met, then sorting control logic 152 is configured to send a message to release logic 158 for release logic 158 to perform the release of the picked-up target objects. Otherwise, if the release criteria are not met, then sorting control logic 154 is configured to send a message to capture logic 156 for capture logic 156 to perform a capture action on a new target object that is determined from the sensor signal as described above.

Capture logic 156 is configured to receive information associated with a target object to capture from sorting control logic 154. For example, information associated with a target object may include the current or projected location of the target object and/or another attribute associated with the target object (e.g., the shape, orientation, material type). Capture logic 156 is configured to use the received information associated with the target object to select a picker mechanism of the material picker assembly to perform the capture action on the target object. For example, a picker mechanism is selected to perform the capture action on the target object based on the picker mechanism currently being in the extended state (and therefore is not currently gripping a target object) and having a location that is close to the location of the target object. Capture logic 156 is configured to send a control signal to an actuator device (e.g., a sorting robot) that is attached to the material picker assembly to instruct the actuator device to actuate the picker mechanism towards the target object. In some embodiments, capture logic 156 is also configured to send a control signal to an air source to provide a vacuum/suction airflow through the selected picker mechanism to assist the picker mechanism in capturing/gripping the target object. In some embodiments, after the selected picker mechanism makes contact with the target object, capture logic 156 is configured to determine whether the capture of the target object is successful based on a grip sensor. For example, the grip sensor is an airflow sensor that is located somewhere between the air source and the material picker assembly or inside the material picker assembly and detects a drop in airflow when the capture action is successful. In some embodiments, depending on the type of suspension element that is included in the selected picker mechanism, the suspension element is pushed from the extended state to the retracted state by the upward force from the gripped target object or the suspension element is changed from the extended state to the retracted state based on a control signal from capture logic 156 to actuate the retraction. After capture logic 156 determines that the selected picker mechanism has successfully picked up the target object, capture logic 156 is configured to send a message to picker state tracker 152 so that picker state tracker 152 can update the current state of the selected picker mechanism to indicate that its suspension element is now in the retracted state. But if capture logic 156 determines that the selected picker mechanism has not successfully picked up the target object, capture logic 156 is configured to determine another target object to capture and repeat the capture process of the other target object using another selected picker mechanism.

Release logic 158 is configured to determine the deposit locations corresponding to the target object(s) that have been picked up by one or more picker mechanisms. In some embodiments, the deposit locations corresponding to the target object(s) are determined based on the material types of the target object(s). For example, objects of the same material type are to be released into a deposit location that corresponds to that material type. If the picked-up target objects all belong to the same material type, for example, then they will all be released into the same deposit location. Release logic 158 is configured to determine for each deposit location into which at least one picked-up target object is to be released, a rotation angle from which to punt each picker mechanism that is to release a picked-up target object, a rotation of the material picker assembly about its central axis, and/or whether to provide a positive airflow through the picker mechanism to forcefully eject the target object during its release. For example, using the location of the picker mechanism and the deposit location of a target object, release logic 158 can dynamically determine the appropriate rotation angle of the picker mechanism, the appropriate rotation about the central axis of the material picker assembly, and the amount of positive airflow to provide to the picker mechanism to ensure that the target object can be punted along a trajectory that will result in the target object being placed into the deposit location. Release logic 158 is then configured to send control signals to a rotational element to rotate each picker mechanism, control signals to the actuator device to rotate the material picker assembly about its central axis, and control signals to an air source to provide a positive airflow to the picker mechanism. After release logic 158 sends the control signals associated with releasing the picked-up target object(s), release logic 158 is configured to send a message to picker state tracker 152 so that picker state tracker 152 can update the current state(s) of the picker mechanism(s) that had released picked-up target objects to indicate that their suspension elements are now in the extended state.

Various embodiments of a material picker assembly with different example suspension elements are described in further detail below.

FIGS. 2A, 2B, 2C, 2D, and 2E show one embodiment of a material picker assembly that uses telescoping tube assemblies as suspension elements for each picker mechanism (hereinafter sometimes referred to simply as "picker"). In some embodiments, material picker assembly 114 of FIG. 1A may be implemented by the example material picker assembly shown in FIGS. 2A, 2B, 2C, 2D, and 2E.

Figure 2A:
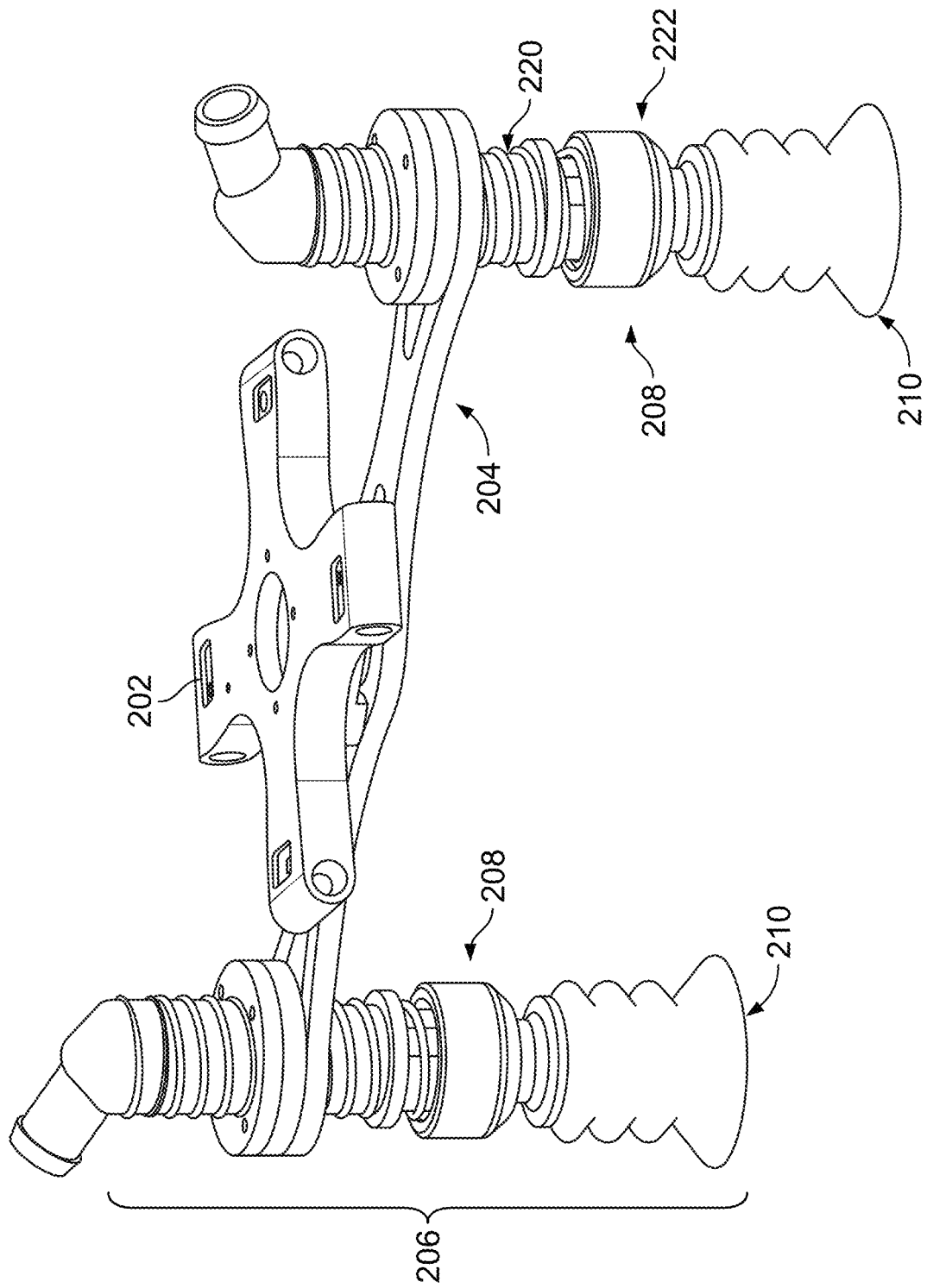
FIG. 2A is a diagram of a material picker assembly that includes two pickers, each with a suspension element that is a telescoping tube assembly and is in the retracted/collapsed state.

FIG. 2A is a diagram of a material picker assembly that includes two pickers, each with a suspension element that is a telescoping tube assembly and is in the retracted/collapsed state. As mentioned above, in some embodiments, the suspension element of a picker is in the retracted/collapsed state after the picker has successfully captured/picked up a target object. As such, each of the pickers shown in FIG. 2A have successfully captured/picked up a respective target object that is not shown in FIG. 2A. In the example of FIG. 2A, the material picker assembly is attachable to an actuator device (e.g., such as sorting robot 108 of FIG. 1A) via a connector, cross component 202. As shown in FIG. 1A, adapter plate(s) 204 are configured to allow the actuator device to hold more than one picker. The example material picker assembly shown in FIG. 2A includes two pickers. Each picker, such as picker 206, uses a suction cup to pick/grip a target object (e.g., off a conveyor device). Each picker, such as picker 206, includes a corresponding telescoping tube assembly 208. Each of telescoping tube assembly 208 is attached to a hose or other means of transferring a vacuum from a vacuum generator and also to a corresponding suction cup 210 for gripping material. FIG. 2A shows the respective telescoping tube assemblies for both pickers as being in the retracted/collapsed state (the retracted state is where the inner tube of the telescoping tube assembly has been pushed into the outer tube).

Figure 2B:
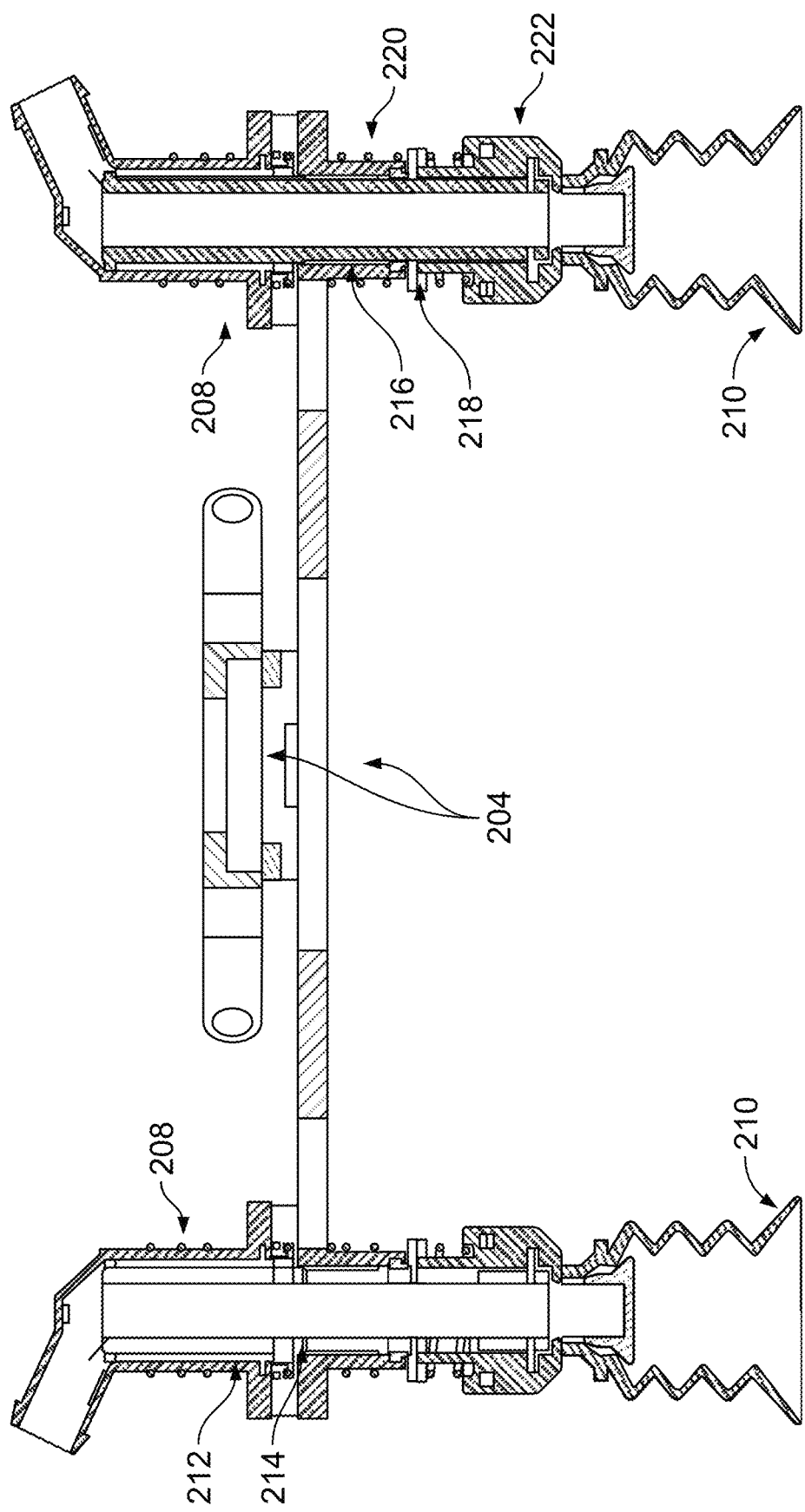
FIG. 2B is a cross-sectional diagram of a material picker assembly that includes two pickers, each with a suspension element that is a telescoping tube assembly and is in the retracted/collapsed state.

FIG. 2B is a cross-sectional diagram of a material picker assembly that includes two pickers, each with a suspension element that is a telescoping tube assembly and is in the retracted/collapsed state. Each telescoping tube assembly 208 includes outer tube 212 and inner tube 214, linear bushing 216, wiper 218, spring 220 to bias outer tube 212 and inner tube 214 in an extended position, and gripper cup attachment feature 222. In some embodiments, outer tube 212 or inner tube 214 can be split and sealed with an o-ring to accommodate assembly of the mechanism.

As mentioned above, both FIGS. 2A and 2B show the pickers of the material picker assembly in the retracted/collapsed state (the retracted state is where the inner tube of the telescoping tube assembly has been pushed into the outer tube). For example, both pickers have telescoping tube assemblies in the retracted/collapsed state because both pickers have been dropped (e.g., by the attached robot) onto two respective target objects (not shown in either FIG. 2A or 2B) and given the distance the pickers have been dropped onto the objects, the heights of the objects have pushed the telescoping tube assemblies of both pickers to cause the pickers to switch from an extended/not collapsed state and into the shown retracted/collapsed state. As such, despite a picker being pushed upwards by a tall object (that the picker is targeting) and/or an object that is not very compressible, the inner tube of the picker will simply collapse back into its corresponding outer tube and prevent the picker or its picked-up object from pushing back into any portion of the robot and potentially damaging the sorting robot.

Figure 2C:
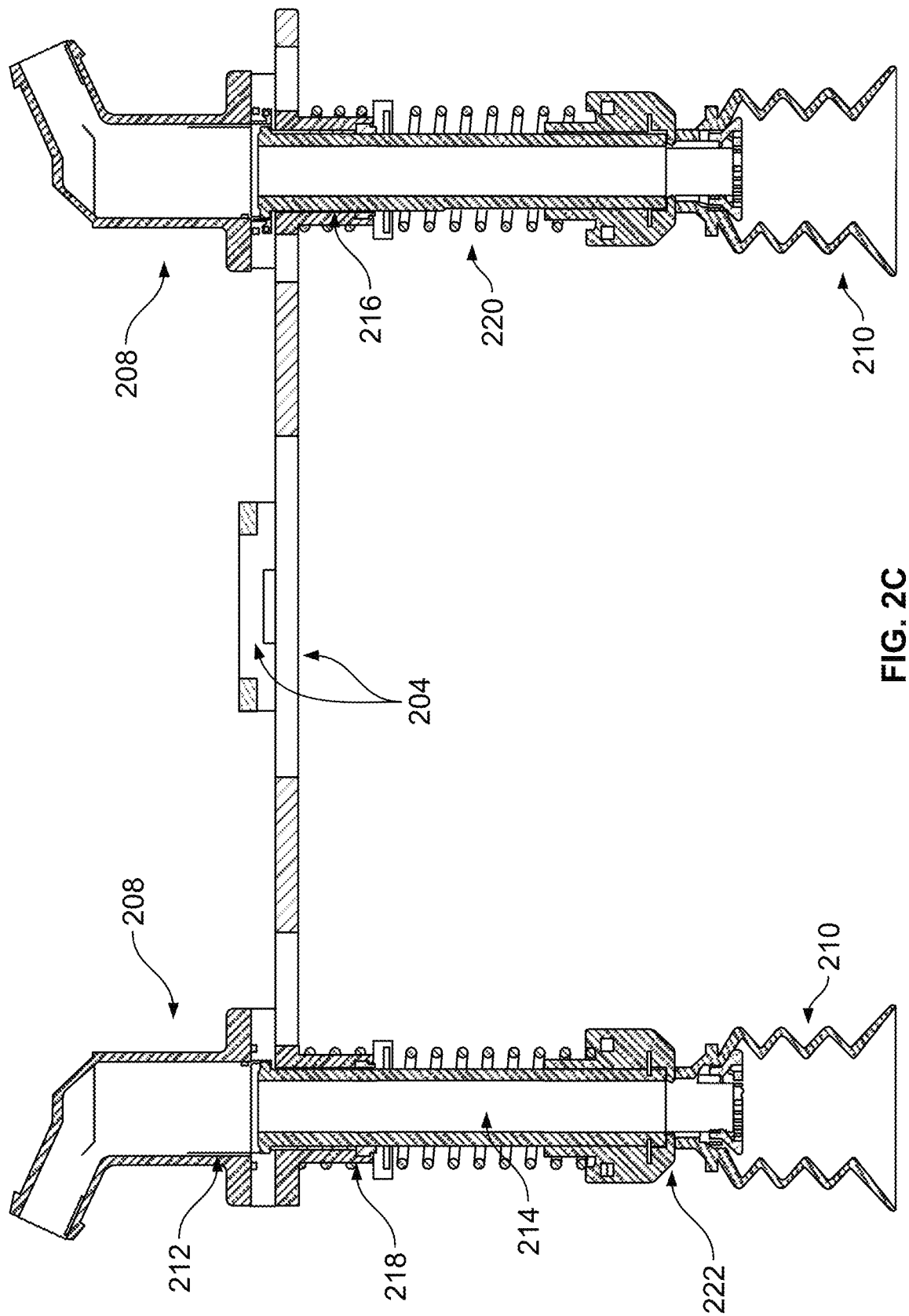
FIG. 2C is a cross-sectional diagram of a material picker assembly that includes two pickers, each with a suspension element that is a telescoping tube assembly and is in the extended (not collapsed) state.

FIG. 2C is a cross-sectional diagram of a material picker assembly that includes two pickers, each with a suspension element that is a telescoping tube assembly and is in the extended (not collapsed) state. The example material picker assembly shown in FIG. 2C is the same as the example material assembly that is shown in FIG. 2B only that each picker that is shown in FIG. 2C is in the extended state (the extended state is where the inner tube of the telescoping tube assembly is extending out from the outer tube), whereas each picker that is shown in FIG. 2B is in the retracted state (the retracted state is where the inner tube of the telescoping tube assembly has been pushed into the outer tube).

Figure 2D:
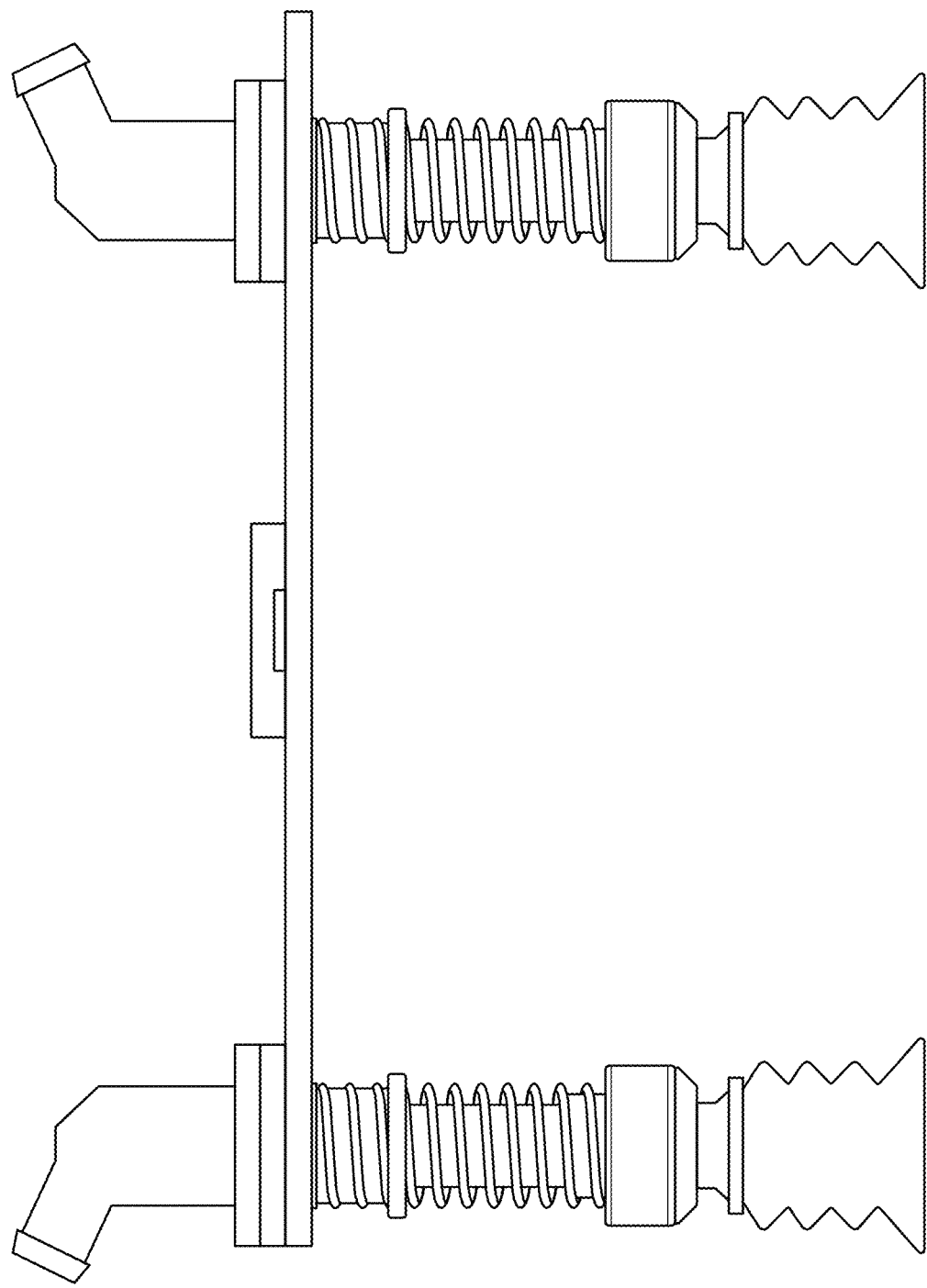
FIG. 2D is a diagram of a material picker assembly that includes two pickers, each with a suspension element that is a telescoping tube assembly and is in the extended (not collapsed) state.

FIG. 2D is a diagram of a material picker assembly that includes two pickers, each with a suspension element that is a telescoping tube assembly and is in the extended (not collapsed) state. FIG. 2D shows another view of the same example material picker assembly that was shown in FIG. 2C but is not cross-sectional.

Figure 2E:
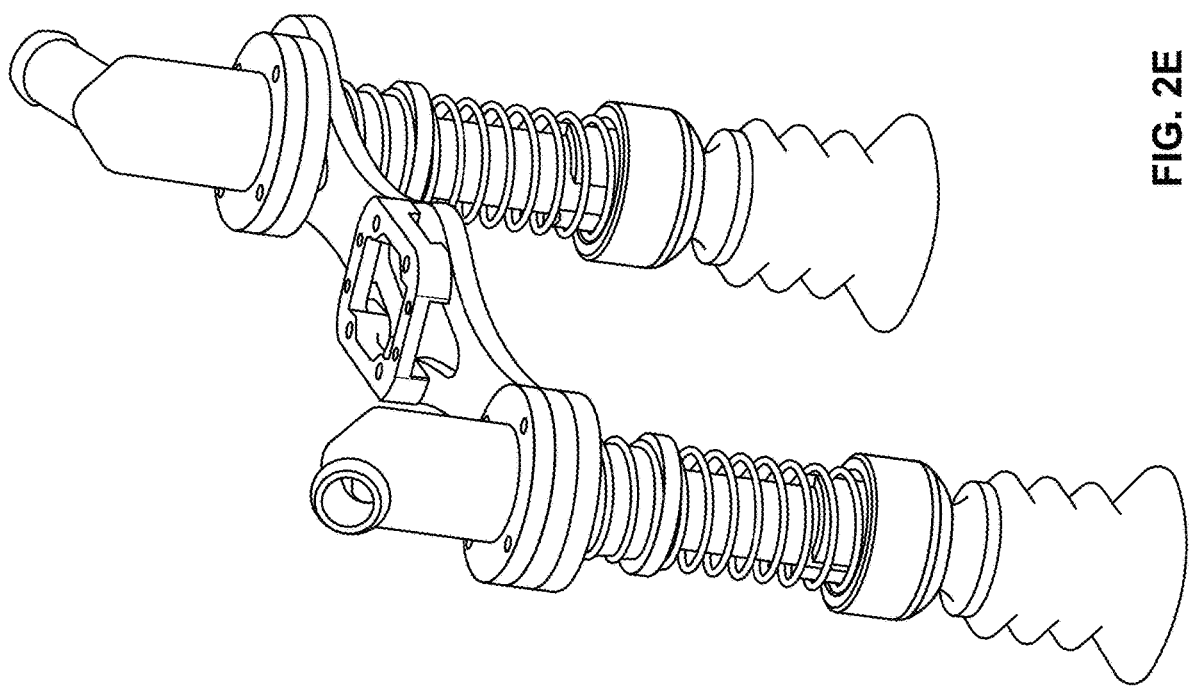
FIG. 2E is a diagram of a material picker assembly that includes two pickers, each with a suspension element that is a telescoping tube assembly and is in the extended (not collapsed) state.

FIG. 2E is a diagram of a material picker assembly that includes two pickers, each with a suspension element that is a telescoping tube assembly and is in the extended (not collapsed) state. FIG. 2E shows another view of the sample example material picker assembly that was shown in FIGS. 2C and 2D but from a partially overhead angle.

In some embodiments, the suspension element comprising a telescoping tube assembly may include an outer and inner tube, a linear bushing, a wiper, a spring to bias the tubes in an extended position, and a suction cup attachment feature. In some embodiments, the suspension element comprising a telescoping tube is mounted on a pivoting mechanism which is driven by a pneumatic spring cylinder or a rotary pneumatic motor. The pneumatic spring cylinder or rotary pneumatic motor allows for the telescoping tube to be actuated independently of the actuator device's action. The addition of the pneumatic spring cylinder or rotary pneumatic motor allows for the actuator device to direct the suction cup into a position that would allow for material to be "punted" into a bunker. In some embodiments, the outer tube may be broken into two or more separate components for assembly and retention purposes of the inner tube in the tube assembly.

As mentioned above, FIGS. 2C, 2D, and 2E show the pickers of the material picker assembly in the not collapsed/extended state (the retracted state is where the inner tube of the telescoping tube assembly extends out from the outer tube). For example, both pickers have telescoping tube assemblies in the not collapsed/extended state because they are waiting to be dropped down to target objects and therefore, have not yet made contact with a target object that could push upwards on each picker. As such, no objects are currently pushing up against the pickers, which would cause the pickers' inner tubes to retract into the outer tubes of the telescoping tube assemblies.

FIGS. 2A, 2B, 2C, 2D, and 2E show an embodiment of a material picker assembly in which the suction cup attachment of a single picker can be pushed up along the Z-axis relative to the conveyor belt as the picker is dropped down onto an object, thanks to a telescoping tube assembly comprising an inner tube that retracts into an outer tube. While not shown in the examples of FIGS. 2A, 2B, 2C, 2D, and 2E, each picker of the material picker assembly is connected to a vacuum generator (air source) and can channel suction airflow to suction and grip a target object. As mentioned above, in some embodiments, the telescoping tube assembly suspension element can remain collapsed while an object is being gripped by the vacuum airflow because the force of the vacuum blockage of a gripped object is sufficient to maintain the telescoping tube assembly in the retracted state.

While the examples of FIGS. 2A, 2B, 2C, 2D, and 2E show a material picker assembly with two pickers, in actual practice, a material picker assembly may have more than two pickers.

While the examples of FIGS. 2A, 2B, 2C, 2D, and 2E show examples of telescoping tubes implementing the suspension element for each picker of the material picker assembly, in actual practice, any mechanism that could facilitate suspension, collapsibility, compliance, and/or shock absorption can be used to implement the suspension element for each picker of the material picker assembly.

FIGS. 3A, 3B, 3C, and 3D show a first embodiment of a material picker assembly that uses linkage mechanisms as suspension elements. In some embodiments, material picker assembly 114 of FIG. 1A may be implemented by the example material picker assembly shown in FIGS. 3A, 3B, 3C, and 3D.

Figure 3A:
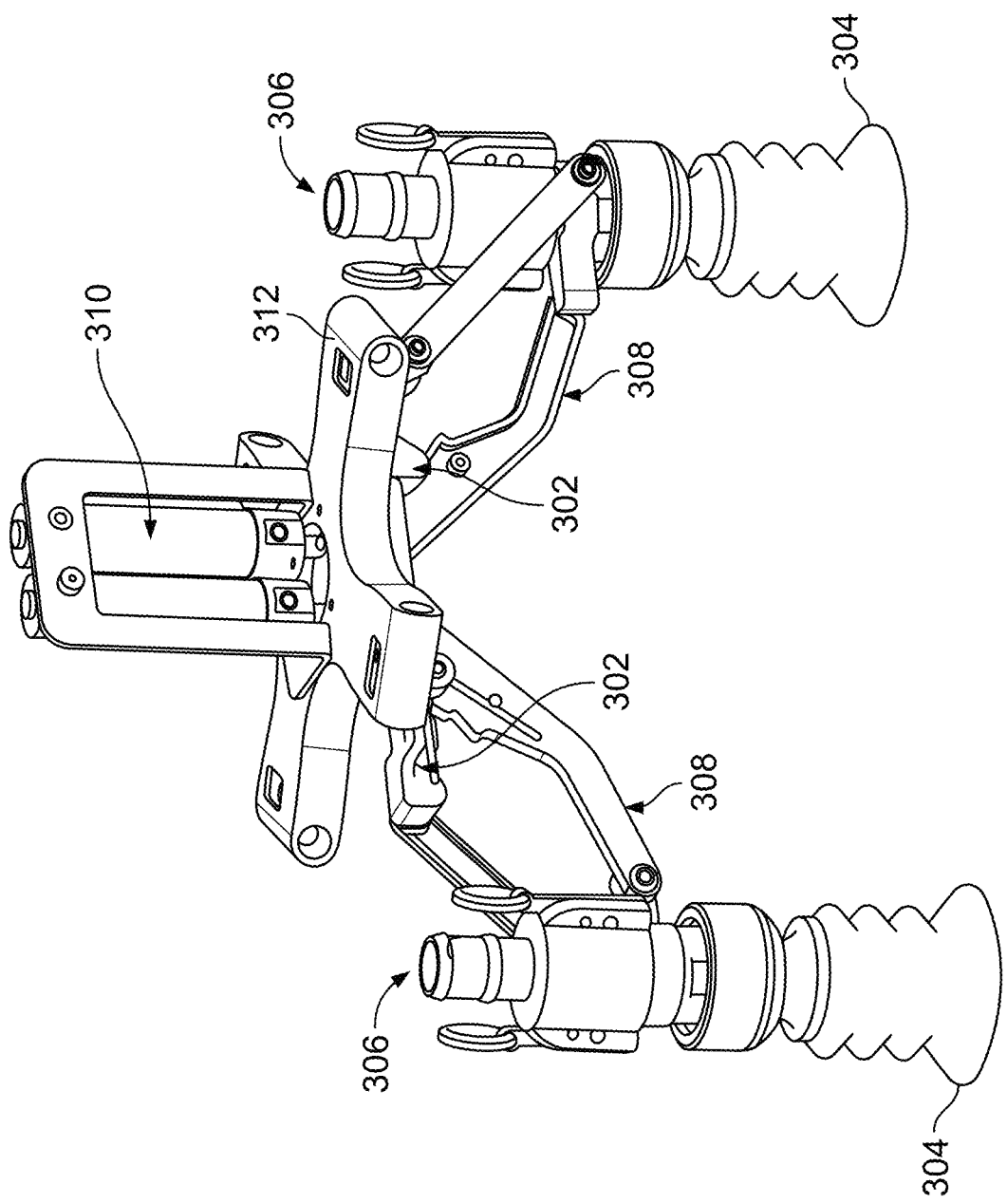
FIG. 3A is a diagram of a material picker assembly that includes two pickers, each with a suspension element that is a linking mechanism in the extended/not collapsed state.

FIG. 3A is a diagram of a material picker assembly that includes two pickers, each with a suspension element that is a linking mechanism in the extended/not collapsed state. In the example of FIG. 3A, adapter plate(s) 302 are configured to allow the material picker assembly to hold multiple pickers. The example assembly shown in FIG. 3A includes two pickers, where each picker includes linkage mechanism 308 (which may be implemented using a four-bar linkage) and suction cup 304 attached to a hose or other means of transferring a vacuum for gripping material. The hose or other means of transferring a vacuum for gripping material attaches to opening 306 of each picker. Each linkage mechanism is actuated by a corresponding one of pneumatic spring cylinder(s) 310, which allow the linkage mechanism to raise and lower independently of the actions of a sorting robot that is coupled to the material picker assembly through connector 312. In the example of FIG. 3A, both pickers are shown in the extended/not collapsed state, which means that linkage mechanism 308 of each of the two pickers is lowered. For example, both pickers each have linkage mechanism 308 in the extended/lowered state because they are waiting to be dropped down to target objects (which are not shown) and therefore, have not yet made contact with a target object that could push upwards on each picker.

Figure 3B:
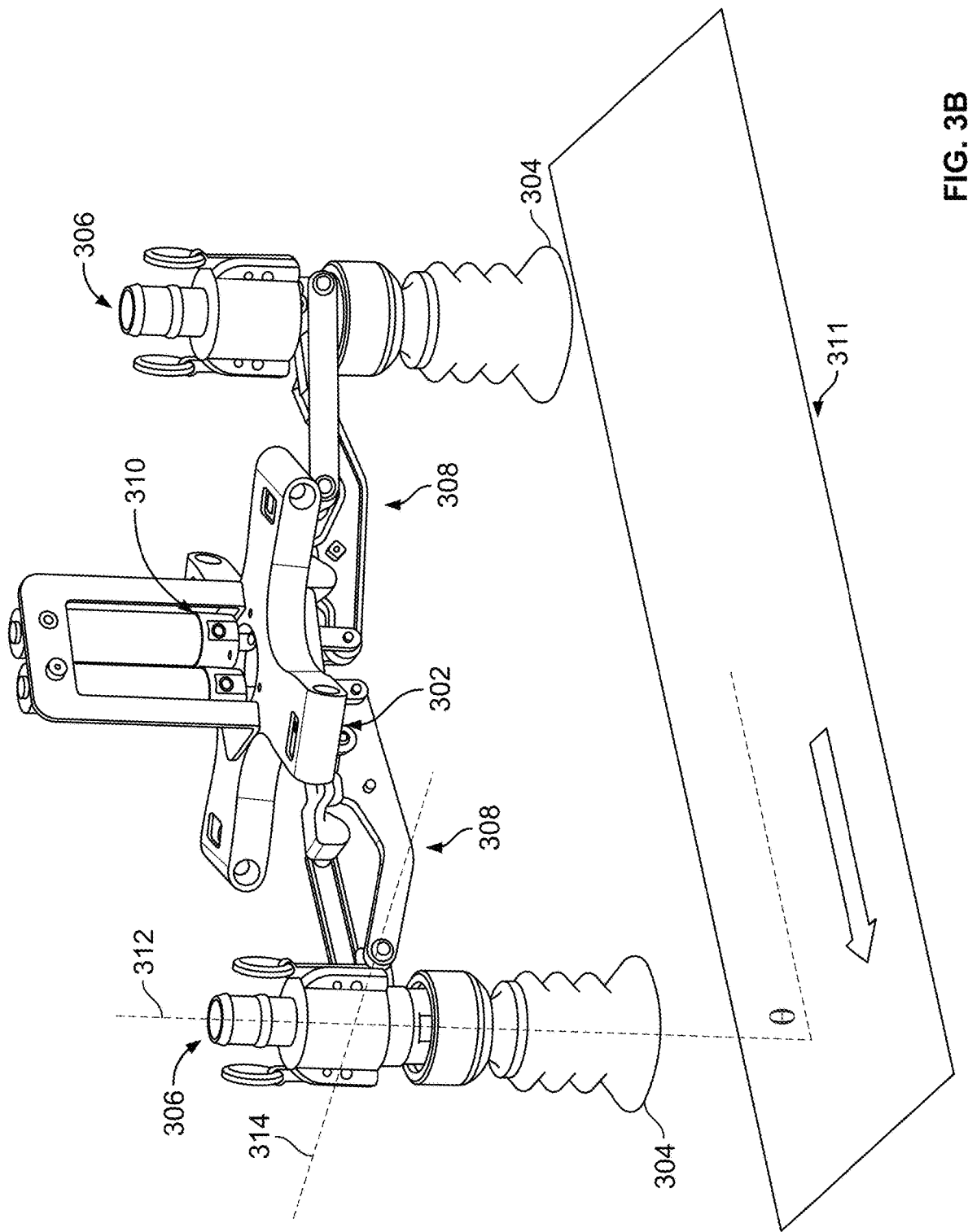
FIG. 3B is a diagram of a material picker assembly that includes two pickers, each with a suspension element that is a linking mechanism in the retracted/collapsed state.

FIG. 3B is a diagram of a material picker assembly that includes two pickers, each with a suspension element that is a linking mechanism in the retracted/collapsed state. In the example of FIG. 3B, adapter plate(s) 302 are configured to allow the material picker assembly to hold multiple pickers. For example, both pickers each have linkage mechanism 308 in the collapsed/lowered state because both pickers have been dropped (e.g., by the attached sorting robot) onto two respective target objects and in response to successfully capturing the target objects, pneumatic spring cylinders 310 were triggered to lift the pickers' linkage mechanisms from their extended/lowered states into the shown retracted/raised states. Pneumatic spring cylinders 310 can force the linkage mechanism 308 into the retracted/collapsed state regardless of the sorting robot's position or the presence of a target object to collapse the mechanism. Pneumatic spring cylinders 310 may actuate linkage mechanism 308 of a single picker after that picker successfully picks up a single target object to prevent the picked-up target object from contacting and interfering with other objects on the conveyor device.

Figure 3C:
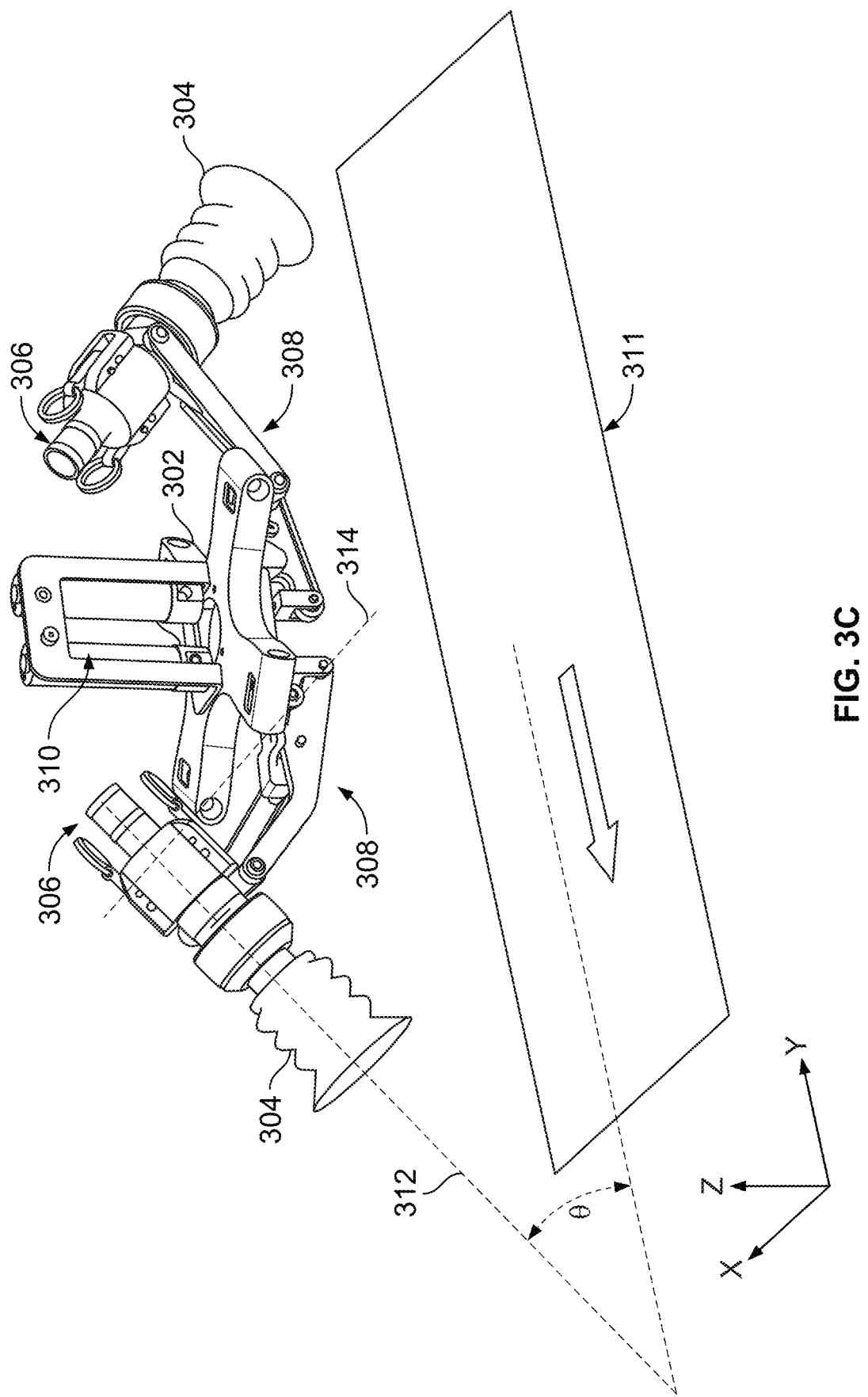
FIG. 3C is a diagram of a material picker assembly that includes two pickers, each with a suspension element that is a linking mechanism in the retracted/collapsed state and also in the punting configuration.

In some embodiments, actuated linkage mechanism 308 of a picker can be designed such that the suction cup can raise and rotate allowing a picked-up target object to be "punted" by the picker into a deposit location. For example, "punting" by the picker includes either dropping/releasing a target object or forcefully shooting/blowing air on the target object to cause the object to be deposited into a deposit location. In some embodiments, to perform a capture action on a target object, a picker in the extended state is in a vertical position orthogonal to the surface of conveyor device 311 and is dropped down (e.g., by a sorting robot) onto the target object on conveyor device 311. While in the vertical position, the suction cup portion of a suction gripper picker is approximately parallel to the surface of conveyor device 311 and the angle between the picker's center axis 312 and the surface of conveyor device 311, θ, is approximately 90 degrees, as shown in FIG. 3B. After the picker successfully captures the target object, linkage mechanism 308 of the picker is placed in the retracted/collapsed state and the picker can also be rotated to be in a punting configuration in which the angle between the picker's center axis 312 and the surface of conveyor device 311, θ, is less than 90 degrees. To enable the punting action, the picker would need to rotate away from the vertical position such that the face of the suction cup of the suction gripper picker is transitioned from being parallel to the surface of conveyor device 311 with θ at roughly 90 degrees as seen in FIG. 3B to rotating away from conveyor device 311 about its individual rotational axis 314 (e.g., where linkage mechanism 308 is attached to plate 302) outwards from the center of the material picker assembly. The rotation of the picker about rotational axis 314 (e.g., where linkage mechanism 308 is attached to the picker) outwards from the center of the material picker assembly causes the angle between the picker's center axis 312 and the surface of conveyor device 311, θ, to be less than 90 degrees, as shown in the diagram of FIG. 3C, which will be described in further detail below. Rotating the picker about its own individual rotational axis 314 (e.g., where linkage mechanism 308 is attached to plate 302) outwards from the center of the material picker assembly allows the gripper to point and eject/punt objects away from conveyor device 311.

In some embodiments, the angle between the picker's center axis 312 and the surface of conveyor device 311, θ, to which a picker should rotate for punting a target object after having successfully picked up the target object is fixed and predetermined. In some embodiments, the angle between the picker's center axis 312 and the surface of conveyor device 311, θ, to which a picker should rotate for punting a target object after having successfully picked up the target object is dynamically determined based on one or more factors. Examples of such factors include the current location (e.g., the (x, y) coordinate) of the picker, the deposit location associated with the target object to be punted, and the force of the positive airflow (if any) that will be used to perform the punting of the target object.

FIG. 3C is a diagram of a material picker assembly that includes two pickers, each with a suspension element that is a linking mechanism in the retracted/collapsed state and also in the punting configuration. In the example of FIG. 3C, adapter plate(s) 302 are configured to allow the material picker assembly to hold multiple pickers. Each picker of the example of FIG. 3C is in the punting configuration by virtue of not only being in the retracted/collapsed state but also having been rotated about rotational axis 314 where the top (suction cup) ends of the pickers are moved outwards from the center of the material picker assembly and are no longer parallel to the surface of conveyor belt 311. For example, both pickers each have linkage mechanism 308 in the retracted/collapsed state and also in the punting configuration because both pickers have already picked up respective target objects and are preparing to release the target objects into deposit locations. By rotating a picker into the punting configuration, each picked-up target object is moved further away (along the Z-axis that extends orthogonal to the surface of the conveyor belt) from conveyor device 311. Putting a picker into the punting configuration reduces the likelihood that the picked-up target object will hit/interfere with other objects on conveyor device 311 and will also allow the picker to aim towards a deposit location (e.g., that is located next to conveyor device 311) into which to eject the target object using the force from a positive airflow.

Figure 3D:
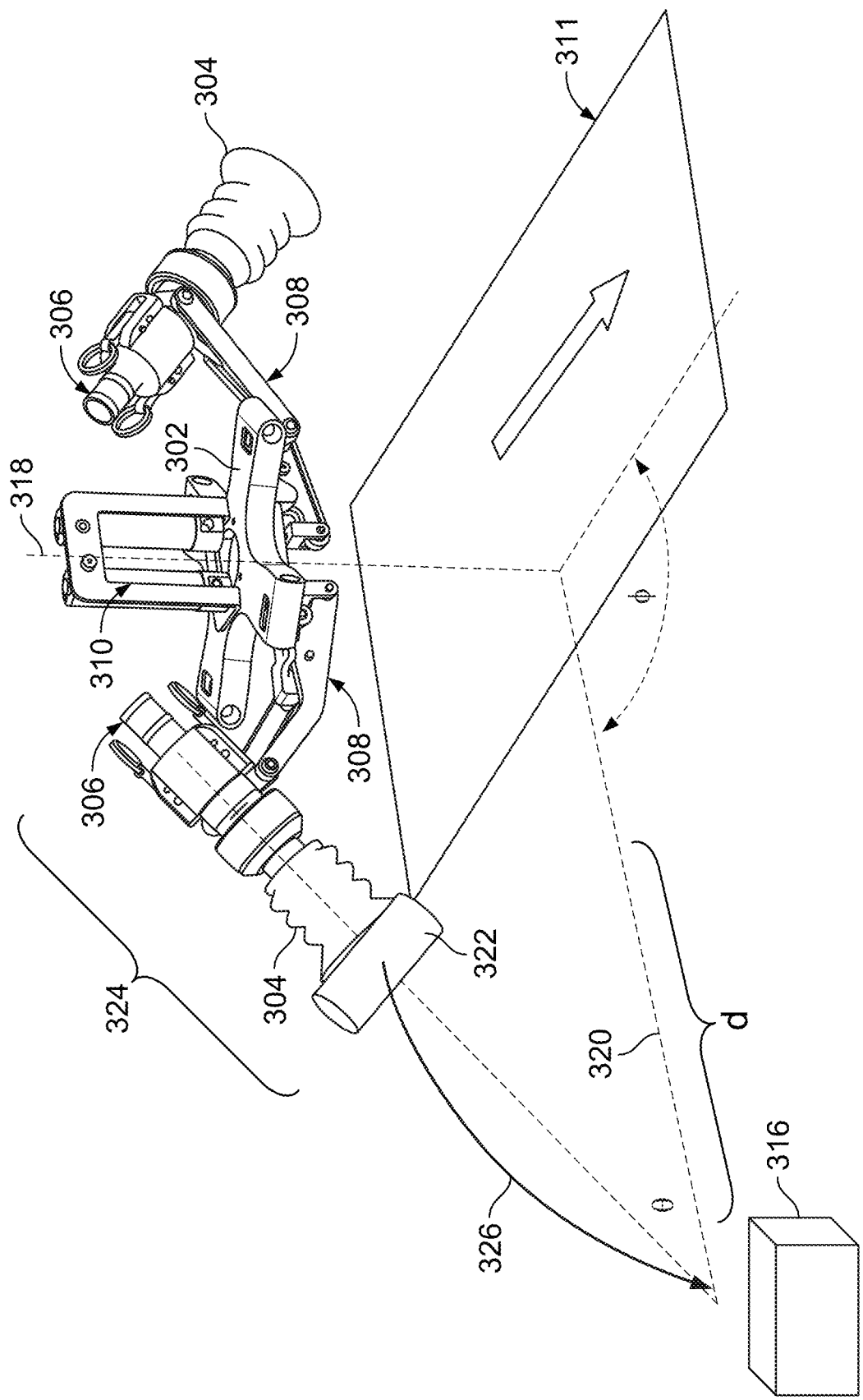
FIG. 3D is a diagram of a material picker assembly that includes two pickers, each with a suspension element that is a linking mechanism in the retracted/collapsed state and also in the punting configuration.

FIG. 3D is a diagram of a material picker assembly that includes two pickers, each with a suspension element that is a linking mechanism in the retracted/collapsed state and also in the punting configuration. In the example of FIG. 3D, adapter plate(s) 302 are configured to allow the material picker assembly to hold multiple pickers. In some embodiments, each picker of the material picker assembly or the entire material picker assembly can be mounted onto a connector (e.g., a plate such as plate 302) that rotates, is attached to a rotating element (e.g., an actuator device such as a sorting robot), or has rotating components incorporated into the connector. This will allow the material picker assembly and the pickers thereof to rotate about central axis 318 of plate 302. The rotation about central axis 318 enables the actuator device to aim the pickers at the deposit locations and reduce the required lateral motion of the actuator device. This type of rotation moves picker's long axis 320 from being parallel to the direction of travel of conveyor device 311 to an angle, ϕ, relative to conveyor device 311 as shown in FIG. 3D. As such, being able to rotate the material picker assembly with the attached pickers about central axis 318 to result in different degrees for ϕ relative to conveyor device 311 greatly increases the deposit locations that each picker can punt/release picked-up objects to.

As mentioned above, in some embodiments, each picker of a material picker assembly with a linkage mechanism (e.g., as shown in the examples of FIGS. 3A, 3B, 3C, and 3D) can channel airflow (e.g., a vacuum/negative airflow to capture a target object and a positive airflow to forcefully toss a picked-up target object), rotate about its own individual rotational axis (e.g., which is where the picker's linkage mechanism is attached to a plate of the material picker assembly) to change angle θ, and/or rotate with the entire material picker assembly about the central axis of the plate of the material picker assembly to change angle ϕ. Such features of the material picker assembly enable the sorting and control device that is configured to send control signals to an air source and actuation elements associated with the material picker assembly to dynamically change the trajectory of a picked-up target object that is to be released/punted by a picker into the object's corresponding deposit location. For example, target object 322 has been picked up by picker 324 of the material picker assembly. The sorting and control device then determines that picker 324 is to punt picked-up target object 322 into deposit location 316. Using the current location of the picker 324 and the location of deposit location 316, the sorting and control device can then determine to cause (e.g., via sending a control signal to) a pneumatic cylinder or other rotational element to rotate picker 324 about its individual rotational axis to a dynamically determined angle θ, cause (e.g., via sending a control signal to) the actuator device to rotate the material picker assembly about its central axis to a dynamically determined angle ϕ, and/or cause (e.g., via sending a control signal to) an air source to provide a positive airflow to result in picker 324 punting picked-up target object 322 along trajectory 326 into deposit location 316.

In FIGS. 3A, 3B, 3C, and 3D, the two pickers of the material picker assembly are arranged approximately 180 degrees from each other. In actual practice, two or more pickers can be attached to a material picker assembly and be arranged any number of degrees apart from each other.

While the examples of FIGS. 3A, 3B, 3C, and 3D show a material picker assembly with two pickers, in actual practice, a material picker assembly may have more than two pickers.

Figure 4A:
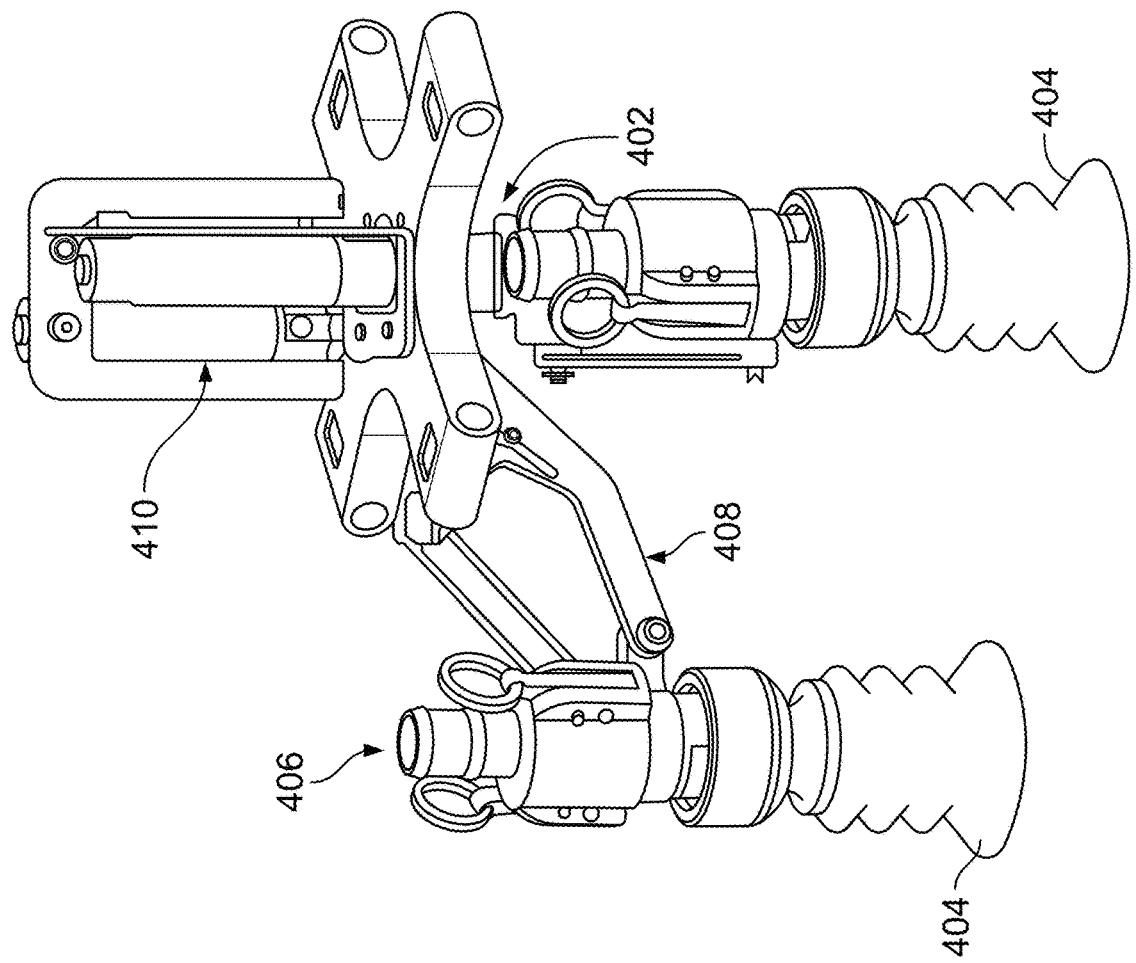
FIG. 4A is a diagram of a material picker assembly that includes two pickers, each with a suspension element that is a linking mechanism in the extended/not collapsed state.
Figure 4B:
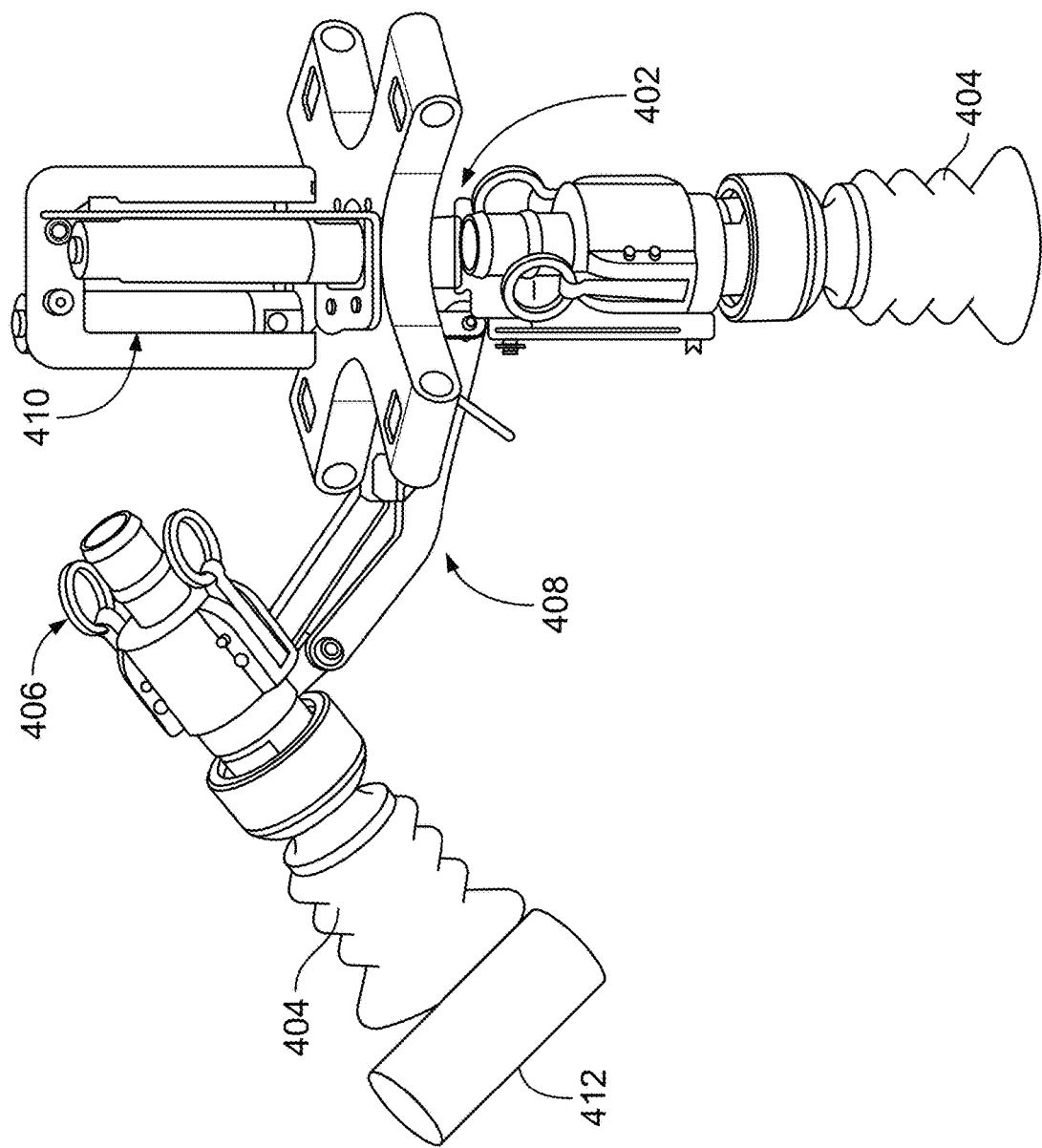
FIG. 4B is a diagram of a material picker assembly that includes two pickers, each with a suspension element that is a linking mechanism, and where one picker is in the extended/not collapsed state and the other picker is in the retracted/collapsed state and is also in the punting configuration.

FIGS. 4A and 4B show a second embodiment of a material picker assembly that uses linkage mechanisms as suspension elements. In some embodiments, material picker assembly 114 of FIG. 1A may be implemented by the example material picker assembly shown in FIGS. 4A and 4B.

The example material picker assembly of FIGS. 4A and 4B is similar to the example material picker assembly of FIGS. 3A, 3B, 3C, and 3D only that the two pickers of the example material picker of FIGS. 3A, 3B, 3C, and 3D are arranged approximately 180 degrees apart and the two pickers of the example material picker assembly of FIGS. 4A and 4B are arranged approximately 90 degrees away from each other.

FIG. 4A is a diagram of a material picker assembly that includes two pickers, each with a suspension element that is a linking mechanism in the extended/not collapsed state. In the example of FIG. 4A, adapter plate(s) 402 are configured to allow the material picker assembly to hold multiple pickers. Similar to the pickers of the example material picker assembly that is shown in FIGS. 3A, 3B, 3C, and 3D, each picker that is shown in FIGS. 4A and 4B includes suction cup 404 that is attached to a hose or other means of transferring vacuum for gripping material via opening 406. Each picker is also attached to linkage mechanism 408, which is enabled by pneumatic spring cylinder(s) 410 to lower and raise up. In the example of FIG. 4A, both pickers are shown in the extended state, which means that linkage mechanism 408 of each of the two pickers is lowered. For example, both pickers each have linkage mechanism 408 in the extended/not collapsed configuration because they are waiting to be dropped down to target objects and therefore, have not yet made contact with a target object that could push upwards on each picker.

FIG. 4B is a diagram of a material picker assembly that includes two pickers, each with a suspension element that is a linking mechanism, and where one picker is in the extended/not collapsed state and the other picker is in the retracted/collapsed state and is also in the punting configuration. In the example of FIG. 4B, adapter plate(s) 402 are configured to allow the material picker assembly to hold multiple pickers. As shown in the example of FIG. 4B, each picker of the material picker assembly may be in a different state (e.g., the extended state or the retracted state and also in the punting configuration) depending on whether the picker has already picked up a target object and/or whether the picker is ready to punt the target object. As mentioned before, each picker can change states independently of the other picker(s) of the same material picker assembly. For example, in FIG. 4B, the picker with linkage mechanism 408 in the extended/lowered state is still waiting to pick up a target object and the picker with linkage mechanism 408 in the retracted/collapsed state with a punting configuration has already picked up target object 412 and is currently preparing to deposit/eject target object 412 into a deposit location.

While the examples of FIGS. 4A and 4B show a material picker assembly with two pickers, in actual practice, a material picker assembly may have more than two pickers.

FIGS. 3A, 3B, 3C, 3D, 4A, and 4B show embodiments of a material picker assembly in which the suction cup attachment of a single picker can retract up along the Z-axis relative to the conveyor device as the picker is dropped down onto an object, thanks to a pneumatic cylinder that actuates the linkage mechanism upwards from an extended state into a retracted state. As such, despite a target object being tall (along the Z-axis relative to the conveyor device) and/or the target object being not very compressible, the linkage mechanism will simply raise upwards and prevent the picker or its picked-up object from pushing back into any portion of the actuator device (e.g., a sorting robot) and potentially damaging the actuator device.

While not shown in the examples of FIGS. 3A, 3B, 3C, 3D, 4A, and 4B, in some embodiments, a four-bar linkage mechanism can be rotated to lift the material picker assembly parallel to conveyor belt travel or perpendicular to conveyor belt travel. In some embodiments, a pneumatic rotary motor and pneumatic spring cylinder that is used to actuate a picker can be replaced with an electric linear actuator or electric motor (e.g., to enable accurate individual rotation of the picker).

While FIGS. 3A, 3B, 3C, 3D, 4A, and 4B show examples of a linkage mechanism implementing the suspension element for each picker of the material picker assembly, in actual practice, any mechanism that would facilitate suspension, collapsibility, compliance, and/or shock absorption can be used to implement the suspension element for each picker of the material picker assembly. In some embodiments, the suspension element of each picker of a material picker assembly includes a flexible hose or other mechanism (e.g., accordion tube) that extends and retracts but does not prevent a vacuum/negative airflow that is channeled through the picker from being cut off during the collapse.

In another embodiment of the material picker assembly that is not shown in the figures described above, the material picker assembly includes an adapter plate or plates to allow the actuator device (e.g., sorting robot) to hold more than one gripper cup, a multitude of telescoping tube assemblies each attached to a hose or other means of transferring a vacuum, and a multitude of suction cups to grip material.

A combination of any of the example suspension elements described above may be used on the same adapter plate allowing for several different configurations.

Figure 5:
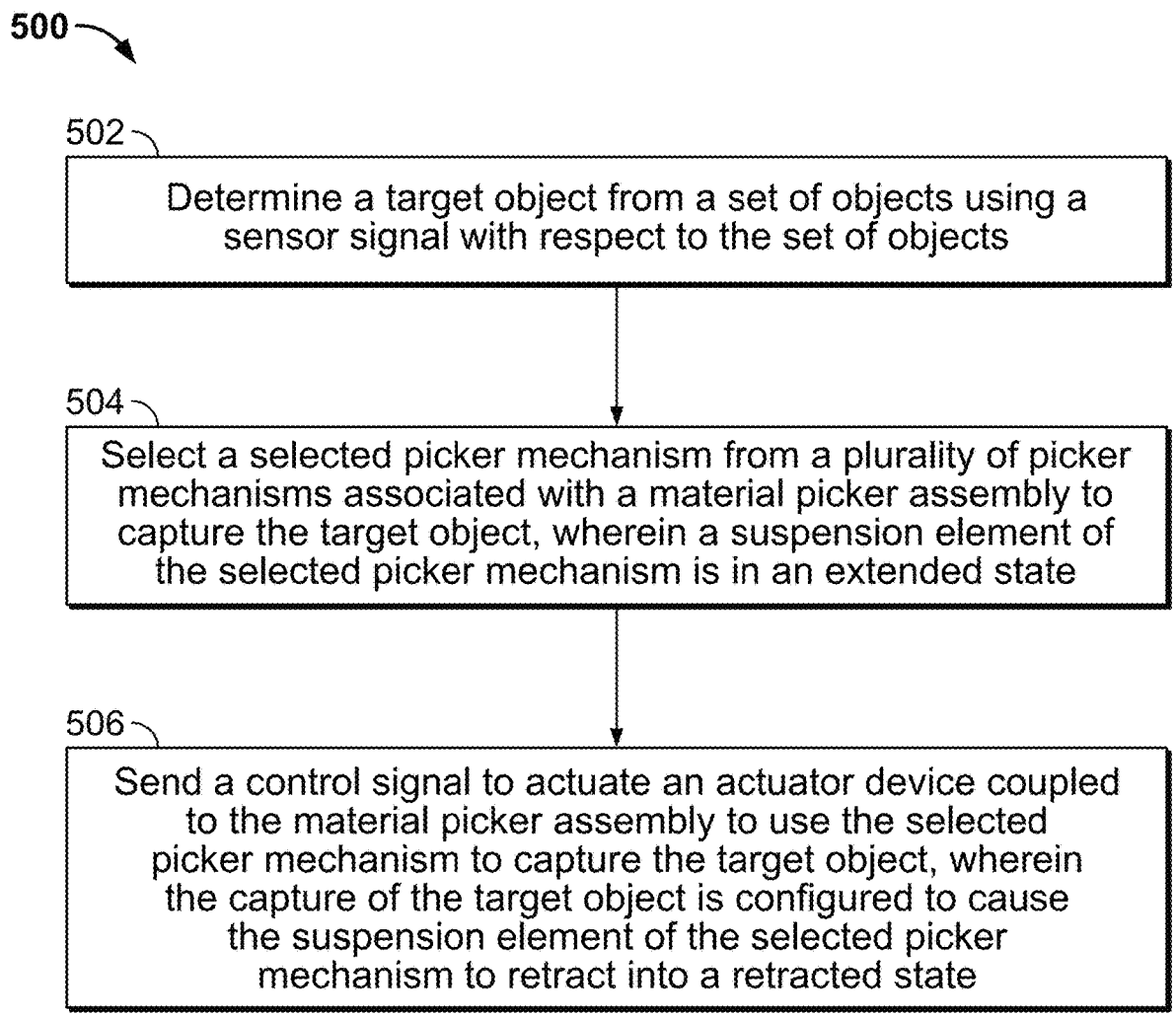
FIG. 5 is a flow diagram showing an embodiment of a process for performing a capture action on a target object using a material picker assembly.

FIG. 5 is a flow diagram showing an embodiment of a process for performing a capture action on a target object using a material picker assembly. In some embodiments, process 500 is implemented, at least in part, by a sorting and control device such as sorting and control device 102 of FIG. 1A.

At 502, a target object is determined from a set of objects using a sensor signal with respect to the set of objects. In some embodiments, sensor output ("sensor signal") from one or more sensors (e.g., a camera or a non-visual sensor) that have captured information about a set of objects (e.g., that are being transported on a conveyor device) is obtained. Then, machine learning is applied to the sensor signal to identify a target object from the set of objects on which to perform a capture action to ultimately recover the target object at a deposit location.

At 504, a selected picker mechanism is selected from a plurality of picker mechanisms associated with a material picker assembly to capture the target object, wherein a suspension element of the selected picker mechanism is in an extended state. One of at least two or more picker mechanisms within a material picker assembly that is being actuated by an actuator device (e.g., a sorting robot) is selected to capture the target object. For example, each picker mechanism is a suction-based gripper. Each picker mechanism also has a suspension element that is in one of at least two states: the extended state and the retracted state. One picker mechanism whose suspension element is in the extended state (and therefore is not currently gripping a target object) can be selected to capture the target object. For example, the picker mechanism whose suspension element is in the extended state and is the closest to the target object can be selected.

At 506, a control signal is sent to actuate an actuator device coupled to the material picker assembly to use the selected picker mechanism to capture the target object, wherein the capture of the target object is configured to cause the suspension element of the selected picker mechanism to retract into a retracted state. The control signal is configured to instruct the actuator device (e.g., a sorting robot) to move the selected picker mechanism towards the current/projected location of the target object to capture the object. In some embodiments, another control signal is sent to an air source to provide a vacuum/negative airflow through the selected picker mechanism so that the suction force can assist the selected picker mechanism with picking up and holding onto the target object. In some embodiments, based on a successful capture of the target object, the suspension element of the selected picker mechanism changes from an extended state to a retracted state. The suspension element in the retracted state will raise the selected picker mechanism along the Z-axis (which is the axis that is orthogonal to the surface of the conveyor device from which the target object was located) to accommodate the height of the target object and to also prevent that picked-up target object from interfering with the capture actions performed with another picker mechanism of the material picker assembly.

Figure 6:
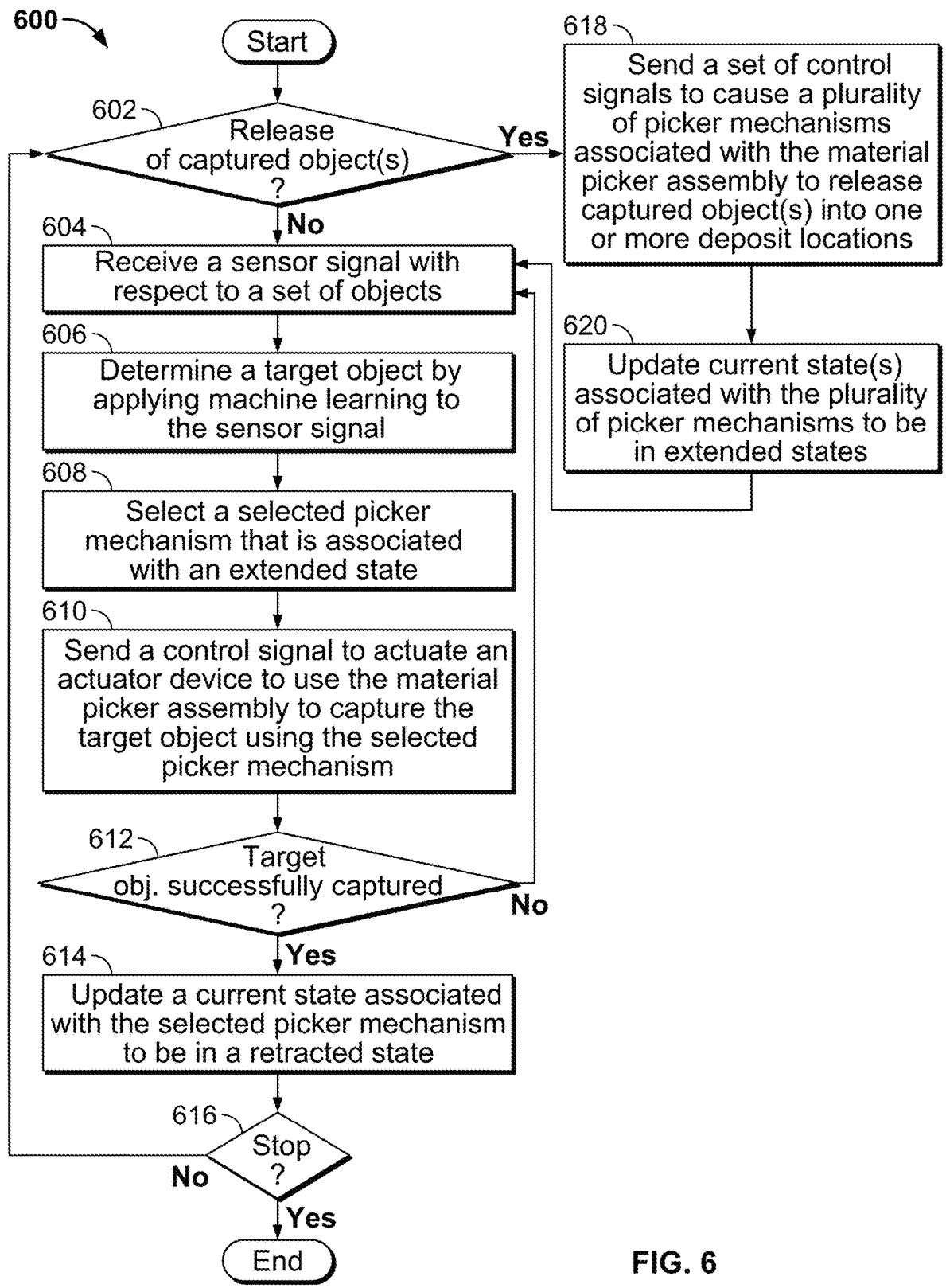
FIG. 6 is a flow diagram showing an embodiment of a process of using a material picker assembly to sort (e.g., capture and release) target objects.

FIG. 6 is a flow diagram showing an embodiment of a process of using a material picker assembly to sort (e.g., capture and release) target objects. In some embodiments, process 600 is implemented, at least in part, by a sorting and control device such as sorting and control device 102 of FIG. 1A. In some embodiments, process 500 of FIG. 5 can be implemented, at least in part, using process 600.

Figure 7:
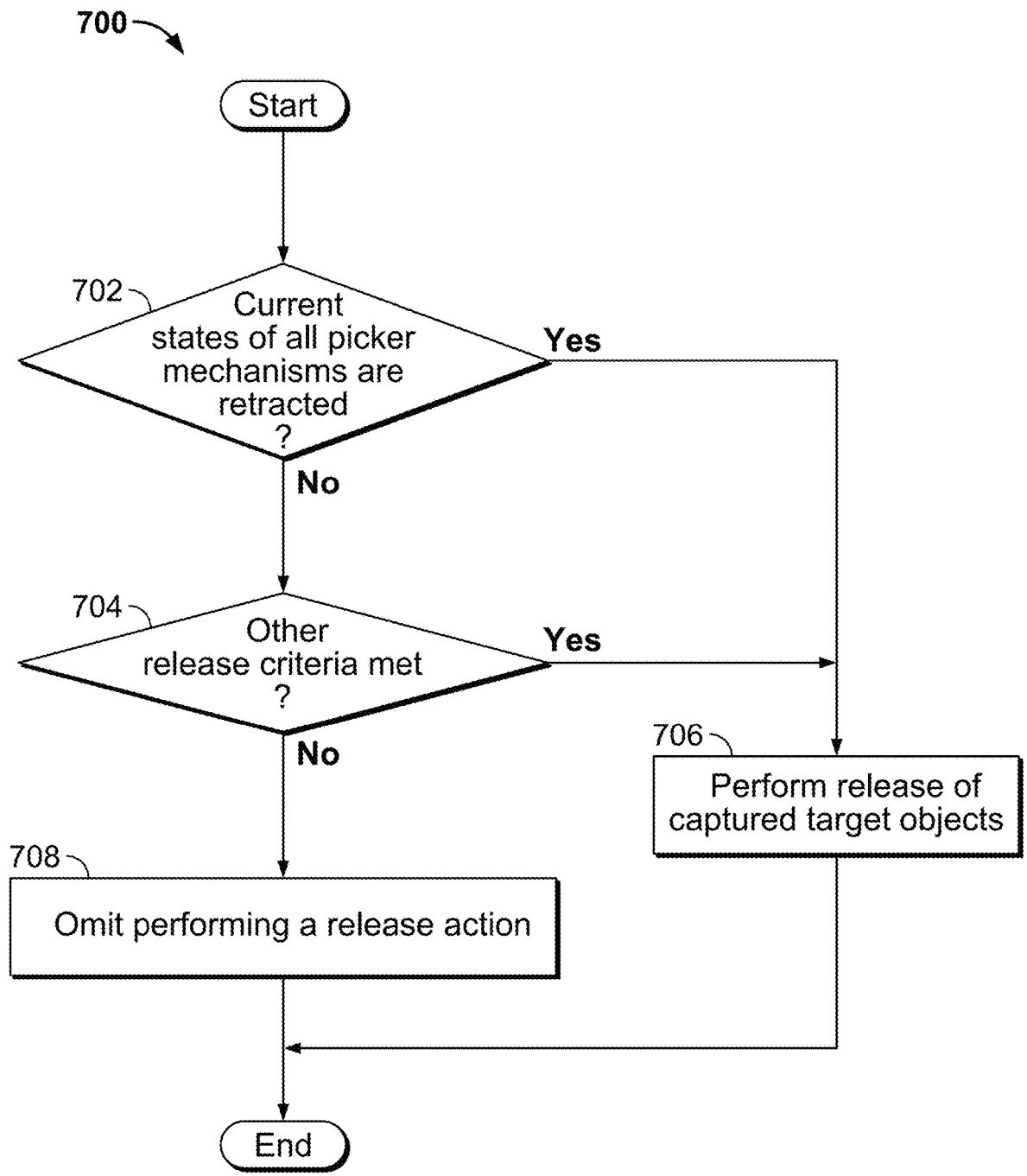
FIG. 7 is a flow diagram showing an example of a process of determining whether a release action is to be performed by a material picker assembly.

At 602, whether object(s) captured by a material picker assembly are to be released is determined. In the event that captured object(s) are to be released, control is transferred to 618. Otherwise, in the event that captured object(s) are not to be released, control is transferred to 604. Whether at least one picker mechanism of the material picker assembly is to perform a release of a picked-up/captured target object is determined based on whether a set of release criteria have been met. In a first example, the set of release criteria indicates that if all picker mechanisms of the material picker assembly are currently gripping/holding onto picked-up respective target objects, then all of the picker mechanisms should release the picked-up target objects (so that the picker mechanisms can become available to capture new target objects). In a second example, if the set of release criteria indicates that at least one but fewer than all of the picker mechanisms of the material picker assembly are currently gripping/holding onto picked-up respective target objects but that no new target objects are currently within reach of the actuator device to capture, then the occupied picker mechanisms should release the picked-up target objects (so that those picker mechanisms can become available to capture new target objects). FIG. 7, below, describes an example process for determining whether object(s) captured by a material picker assembly are to be released.

Figure 8:
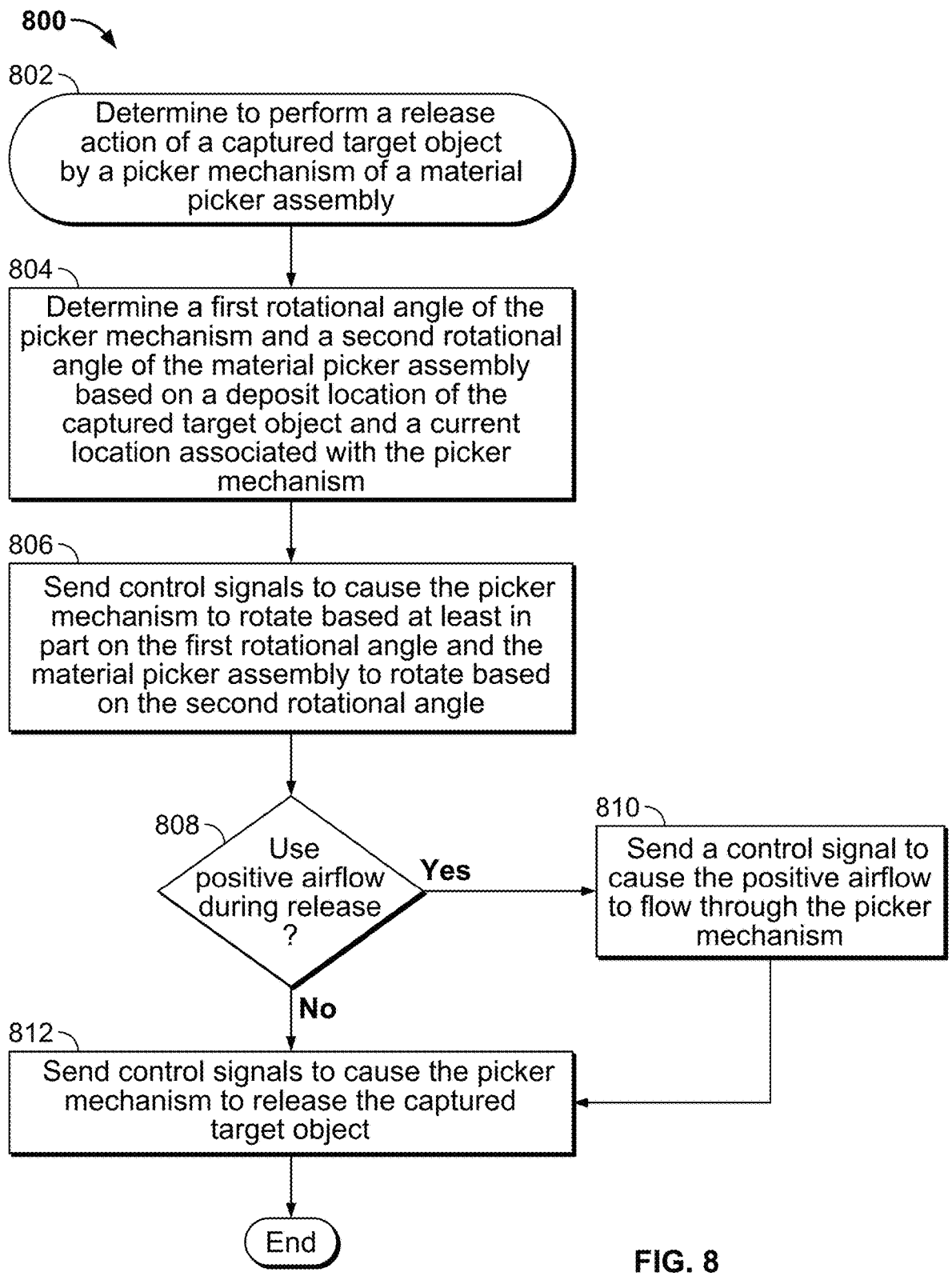
FIG. 8 is a flow diagram showing an example of a process of determining how to perform a release by a picker mechanism of a material picker assembly.

At 618, a set of control signals is sent to cause a plurality of picker mechanisms associated with the material picker assembly to release captured object(s) into one or more deposit locations. In some embodiments, a control signal is sent to the actuator device to (e.g., laterally and/or vertically) move the material picker assembly to and/or above each of the deposit locations corresponding to the target objects that had been picked up by a picker mechanism. In some embodiments, a control signal is sent to the actuator device to rotate the material picker assembly above its central axis so that one or more of its picker mechanisms can be pointed towards the deposit locations corresponding to the target objects that had been picked up by the picker mechanism(s). In some embodiments, a control signal is sent to an air source to trigger the flow of a positive airflow to emit out of each picker mechanism of the material picker assembly to assist in forcefully tossing each picked-up target object towards its deposit location. In some embodiments, a control signal is sent to a rotational element that is configured to rotate each picker mechanism outwards from the center of the material picker assembly so that it can be pointed towards the deposit location of a to-be-released target object. FIG. 8, below, describes an example process for causing objects captured by picker mechanisms of a material picker assembly to be released.

At 620, current state(s) associated with the plurality of picker mechanisms are updated to be in extended states. As mentioned above, in some embodiments, when a picker mechanism is gripping a target object, its corresponding suspension element is in the retracted state. After the control signals have been sent to cause the release of the picked-up/captured target objects, the current states of the picker mechanisms are updated to indicate that their suspension elements are in the extended state. In some embodiments, returning the suspension element of a picker mechanism from the retracted state to the extended state includes changing the direction of the airflow that was flowing through the picker mechanism and/or sending a rotational or other picker mechanism-specific actuation element to change the position of the suspension element into the extended position (e.g., the pneumatic cylinder of a suspension element comprising a linkage mechanism can be used to lower the retracted linkage mechanism down to the extended position).

At 604, a sensor signal with respect to a set of objects is received. The sensor signal is received from one or more sensors that had captured features associated with the set of objects. For example, the set of objects comprises a stream of materials that are being transported by a conveyor device. For example, the sensor signal comprises an image frame.

At 606, a target object among the set of objects is determined by applying machine learning to the sensor signal. The sensor signal is analyzed using neural network(s) and/or other artificial intelligence techniques, and/or other signal processing techniques to identify one or more target objects to remove from the stream. For example, an object is identified as a target object by meeting a set of target object criteria.

At 608, a selected picker mechanism that is associated with an extended state is selected. As mentioned above, a picker mechanism whose suspension element is in the extended state is not currently holding/gripping a target object and is therefore available to pick up a target object. A picker mechanism whose suspension element is in the extended state is selected to pick up the target object based at least in part on an attribute of the picker mechanism and an attribute of the target object. For example, the picker mechanism whose current location is the closest to the location of the target object is selected to capture that target object.

At 610, a control signal is sent to actuate an actuator device to use the material picker assembly to capture the target object using the selected picker mechanism. A control signal is sent to the actuator device that is attached to the material picker assembly to cause the actuator device to (e.g., laterally) move the location of the selected picker mechanism close to the current/projected location of the target object and to lower the selected picker mechanism onto the target object. In some embodiments, a control signal is sent to an air source to trigger the flow of pressurized vacuum air through the selected picker mechanism so that the suction airflow can assist in the selected picker mechanism's capture of the target object.

At 612, whether a target object is successfully captured is determined. In the event that the target object is successfully captured, control is transferred to 614. Otherwise, in the event that the target object is not successfully captured, control is returned to 604. In some embodiments, whether the target object is successfully captured by the selected picker mechanism is determined by detecting a change in the profile of the rate of airflow/pressure of the air that is being channeled by the selected picker mechanism. For example, if the rate of the airflow or if the pressure of the air that is being channeled by the selected picker mechanism drops by at least a predetermined amount, then it is determined that the target object has been successfully captured/gripped by the selected picker mechanism. In some embodiments, the rate of airflow and/or pressure of the air can be measured by a grip sensor that is located within the material picker assembly, within a tubing that channels air from the air source, and/or within the actuator device that actuates the material picker assembly.

At 614, a current state associated with the selected picker mechanism is updated to be in a retracted state. In response to a determination of a successful pick-up/capture of the target object, the current state of the selected picker mechanism is updated to indicate that its suspension element is in the retracted state. In some embodiments, the suspension element of the selected picker mechanism is changed from the extended state to the retracted state based on the upward force from the captured target object and the vacuum airflow (e.g., where the suspension element comprises a telescoping tube assembly). In some embodiments, the suspension element of the selected picker mechanism is changed from the extended state to the retracted state using the actuation by an actuation element (e.g., a pneumatic cylinder or an electric actuator can cause the suspension element comprising a linkage mechanism to raise from the extended state to the retracted state).

At 616, whether sorting using the material picker assembly is to be stopped is determined. In the event that sorting using the material picker assembly is to continue, control is returned to 602. Otherwise, in the event that sorting using the material picker assembly is to stop, process 600 ends. For example, sorting using the material picker assembly is to be stopped if power to the sorting and control device is shut down.

FIG. 7 is a flow diagram showing an example of a process of determining whether a release action is to be performed by a material picker assembly. In some embodiments, process 700 is implemented, at least in part, by a sorting and control device such as sorting and control device 102 of FIG. 1A. In some embodiments, step 602 of process 600 of FIG. 6 can be implemented, at least in part, by process 700.

At 702, whether the current states of all picker mechanisms indicate that their suspension elements are in the retracted state is determined. In the event that the current states of all picker mechanisms indicate that their suspension elements are in the retracted state, control is transferred to 706. Otherwise, in the event that the current states of less than all picker mechanisms indicate that their suspension elements are in the retracted state, control is transferred to 704. If the current state of every picker mechanism included in the material picker assembly indicates that the picker mechanism's suspension element is in a retracted state, then it can be determined that every picker mechanism is currently gripping/holding onto a respective target object. If every picker mechanism is currently gripping/holding onto a respective target object, then the picker mechanisms will need to release the picked-up target objects so they can become available to pick up new target objects.

At 704, whether other release criteria are met is determined. In the event that other release criteria are met, control is transferred to 706. Otherwise, in the event that no other release criteria are met, control is transferred to 708. If the current states of fewer than all picker mechanisms included in the material picker assembly indicate that their picker mechanisms' suspension element is in a retracted state, then it can be determined that fewer than all picker mechanisms are currently gripping/holding onto a respective target object. However, even if not every picker mechanism is currently gripping/holding onto a respective target object, other release criteria can be met that would prompt the picked-up target objects to be released. A first example of such other release criteria is if given the given location(s) of target objects on the conveyor device and the movement constraints of the actuator device that is attached to the material picker assembly, the actuator device cannot reach any of such target objects. A second example of such other release criteria is if there is a high priority associated with any or collectively all of picked-up target objects such that they should be collected (e.g., deposited into a deposit location) at the earliest opportunity (e.g., before a subsequent target object is picked up).

At 706, release of captured target objects is performed. Examples of how such captured/picked-up target objects can be released by the respective picker mechanisms that are gripping them are described in process 600 of FIG. 6.

At 708, performing a release action is omitted. A release action is not performed by any of the picker mechanisms if none of the picker mechanisms are currently gripping/holding onto a target object and/or at least one of the picker mechanisms is currently gripping/holding onto a target object but another release criteria is not met.

FIG. 8 is a flow diagram showing an example of a process of determining how to perform a release by a picker mechanism of a material picker assembly. In some embodiments, process 800 is implemented, at least in part, by a sorting and control device such as sorting and control device 102 of FIG. 1A. In some embodiments, step 618 of process 600 of FIG. 6 can be implemented, at least in part, by process 800.

In some embodiments, an instance of process 800 can be separately implemented for each picker mechanism of the material picker assembly that is to perform a release of a captured target object.

At 802, it has been determined to perform a release action of a captured target object by a picker mechanism of a material picker assembly.

At 804, a first rotational angle of the picker mechanism and a second rotational angle of the material picker assembly are determined based on a deposit location of the captured target object and a current location associated with the picker mechanism. The first rotational angle is the angle $\theta$ (as described with FIGS. 3B and 3C) from which the picker mechanism is to punt the target object. The second rotational angle is the angle $\phi$ (as described with FIG. 3D) to which the material picker assembly is to be rotated about its central axis.

At 806, control signals to cause the picker mechanism to rotate based on the first rotational angle and to cause the material picker assembly to rotate based on the second rotational angle are sent. For example, a first control signal is sent to an actuation element that is configured to rotate the picker mechanism about its own rotational axis into a punting configuration based on the first rotational angle ($\theta$). For example, a second control signal is sent to an actuator device that is attached to the material picker assembly to cause the actuator device to rotate the material picker assembly about its central axis based on the second rotational angle ($\phi$).

At 808, whether a positive airflow is to be used during release of the captured target object is determined. In the event that a positive airflow is to be used during release of the captured target object, control is transferred to 810. Otherwise, in the event that a positive airflow is not to be used during release of the captured target object, control is transferred to 812. For example, the use of a positive airflow can be determined to ensure that the target object is ejected from the grip of the picker mechanism. In another example, the use of a positive airflow can be determined to punt/shoot the target object into a deposit location where the actuator device cannot move over to vertically drop the target object into the deposit location. In yet another example, the use of a positive airflow can be determined to punt/eject the target object but also simultaneously clean out any residue that might have accrued within the picker mechanism. An example where positive air flow would not be used is in the case where positive airflow would hinder the proper location or disposition of the picked object. In this case the material might be identified as having aerodynamically unfavorable properties and using air flow would result in a high probability of a miss placed object.

At 810, a control signal to cause the positive airflow to flow through the picker mechanism is sent. The control signal to trigger the positive airflow can be sent to an air source and/or a system that is configured to control the air source.

At 812, control signals to cause the picker mechanism to release the captured target object are sent. For example, a first control signal is sent to the actuator device that is attached to the material picker assembly to cause the actuator device to move the picker mechanism closer to the deposit location corresponding to the captured target object. For example, a second control signal to cause the picker mechanism to release may be sent to the air source and/or a system that is configured to control the air source to cause the vacuum airflow (so that no suction force is going to hold onto the captured target object) and if the use of the positive airflow is determined, then the positive airflow is also provided (to forcefully eject the captured target object).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A material picker assembly, comprising:
   a connector configured to be attached to an actuator device; and
   a plurality of picker mechanisms, wherein a first picker mechanism from the plurality of picker mechanism includes a respective suspension element that is configured to absorb impact on the first picker mechanism by one or more objects,
   wherein after the first picker mechanism has gripped an object, the respective suspension element is operable to be rotated away from a center of the material picker assembly based on an angle θ, wherein the angle θ is dynamically determined based on a current location of the first picker mechanism, a location associated with a deposit location of the object, and a force of a positive airflow to be used to punt the object.

2. The material picker assembly of claim 1, wherein the respective suspension element comprises a linkage mechanism.

3. The material picker assembly of claim 2, wherein the linkage mechanism is lowered prior to absorbing impact on the first picker mechanism by the one or more objects.

4. The material picker assembly of claim 2, wherein the linkage mechanism is raised to absorb the impact on the first picker mechanism by the one or more objects.

5. The material picker assembly of claim 2, wherein the linkage mechanism is capable of rotation.

6. The material picker assembly of claim 2, wherein the linkage mechanism is configured to be actuated by one or more of the following: a pneumatic cylinder, an electric actuator, and an electric motor.

7. The material picker assembly of claim 1, wherein at least one picker mechanism is coupled to an air source and is configured to channel at least one of a negative airflow and the positive airflow provided by the air source.

8. The material picker assembly of claim 1, wherein the first picker mechanism having gripped the object is operable to be rotated away from the center of the material picker assembly such that the angle, θ, between a center axis of the first picker mechanism and a surface from which the object is gripped is less than 90 degrees.

9. The material picker assembly of claim 1, wherein the object was gripped by the first picker mechanism from a conveyor device.

10. The material picker assembly of claim 1, wherein the connector is operable to rotate the plurality of picker mechanisms.

* * * * *